United States Patent
Courvoisier et al.

(10) Patent No.: US 12,489,820 B2
(45) Date of Patent: Dec. 2, 2025

(54) METHOD AND SYSTEM FOR DATA STREAM ANALYSIS

(71) Applicant: NANO CORP., Paris (FR)

(72) Inventors: François Courvoisier, Paris (FR); Frederic Le Picard, Paris (FR)

(73) Assignee: NANO CORP., Paris (FR)

( * ) Notice: Subject to any disclaimer, the term of this patent is extended or adjusted under 35 U.S.C. 154(b) by 15 days.

(21) Appl. No.: 18/690,226

(22) PCT Filed: Sep. 7, 2022

(86) PCT No.: PCT/EP2022/074915
§ 371 (c)(1),
(2) Date: Mar. 7, 2024

(87) PCT Pub. No.: WO2023/036846
PCT Pub. Date: Jun. 16, 2023

(65) Prior Publication Data
US 2024/0406274 A1    Dec. 5, 2024

(30) Foreign Application Priority Data
Sep. 7, 2021 (FR) ........................ 2109379

(51) Int. Cl.
*G06F 15/16* (2006.01)
*H04L 67/146* (2022.01)
(Continued)

(52) U.S. Cl.
CPC ............ *H04L 67/146* (2013.01); *H04L 69/18* (2013.01); *H04L 69/22* (2013.01)

(58) Field of Classification Search
CPC ........ H04L 67/146; H04L 69/18; H04L 69/22
(Continued)

(56) References Cited

U.S. PATENT DOCUMENTS 7,451,235 B2 * 11/2008 Bunn ................. H04N 21/4782
709/236
7,970,948 B1 * 6/2011 Moberg ..................... H04L 9/40
709/236
(Continued)

FOREIGN PATENT DOCUMENTS

EP          1788490          5/2007

OTHER PUBLICATIONS

International Search Report and Written Opinion from related application PCT/EP2022/074915 mailed Dec. 7, 2022.
(Continued)

*Primary Examiner* — Moustafa M Meky
(74) *Attorney, Agent, or Firm* — GREENBLUM & BERNSTEIN, P.L.C.

(57) ABSTRACT

The invention relates to a method for analysing a data stream of data packets received via a communications network, a protocol analysis (DAP) according to the following steps:
  analysing the first packet (P0) of a batch to check whether the first packet (P0) announces the protocol of the next data packet (P1);
  analysing the next protocol or protocols Pi+n with n≥2 by repeating the steps of explicit detection classification (S10), session detection classification (S20), and deep packet inspection classification (S40) until at least one protocol, the identity of which is certain, is identified; and—associating a label with the data packets; and its implementation system.

19 Claims, 18 Drawing Sheets

(51) Int. Cl.
*H04L 69/18* (2022.01)
*H04L 69/22* (2022.01)

(58) Field of Classification Search
USPC .......................................................... 709/224
See application file for complete search history.

(56) References Cited

U.S. PATENT DOCUMENTS

| | | | | |
|---|---|---|---|---|
| 8,073,012 | B2* | 12/2011 | Jiang | .................... H04L 1/1874 |
| | | | | 370/476 |
| 9,106,475 | B2* | 8/2015 | Matsumura | ............. H04L 69/18 |
| 9,667,479 | B2* | 5/2017 | Zhou | ........................ H04L 12/12 |
| 10,686,735 | B1* | 6/2020 | Watson | ................. H04L 67/63 |
| 10,694,006 | B1* | 6/2020 | Watson | ............... H04L 49/9042 |
| 10,757,028 | B1* | 8/2020 | Watson | ................... H04L 67/63 |
| 11,082,494 | B2* | 8/2021 | Seurynck | ................ H04L 69/18 |
| 11,425,058 | B2* | 8/2022 | Watson | ............... H04L 49/3009 |
| 2004/0156389 | A1* | 8/2004 | Sha | ......................... H04L 69/22 |
| | | | | 370/466 |
| 2006/0106583 | A1 | 5/2006 | Fdida et al. | |
| 2006/0182143 | A1* | 8/2006 | Lu | ............................ H04L 69/22 |
| | | | | 370/328 |
| 2008/0273551 | A1* | 11/2008 | Jiang | ..................... H04L 1/1832 |
| | | | | 370/466 |
| 2009/0274173 | A1* | 11/2009 | Wentink | .................. H04L 69/22 |
| | | | | 370/474 |
| 2016/0112287 | A1 | 4/2016 | Farmer et al. | |
| 2018/0109451 | A1* | 4/2018 | Wei | ........................ H04L 69/166 |
| 2018/0115634 | A1* | 4/2018 | Wei | ........................ H04L 1/1642 |
| 2018/0131609 | A1* | 5/2018 | Wei | ..................... H04L 12/1403 |
| 2020/0314219 | A1* | 10/2020 | Watson | ............... H04L 49/9057 |
| 2021/0176315 | A1* | 6/2021 | Seurynck | ................ H04L 67/60 |
| 2021/0385138 | A1 | 12/2021 | Watson et al. | |

OTHER PUBLICATIONS

International Search Report and Written Opinion from related application PCT/EP2022/074918 mailed Dec. 12, 2022.

* cited by examiner

METHOD AND SYSTEM FOR DATA STREAM ANALYSIS

CROSS REFERENCE TO RELATED APPLICATIONS

This application is a U.S. National Stage Application of International application No. PCT/EP2022/074915 filed 7 Sep. 2022, which is based on and claims the benefit of France Patent Application No. 109379 filed 7 Sep. 2021, both of which are incorporated by reference herein in their entirety.

BACKGROUND

Technological developments in networking have resulted in an increase in networking speeds beyond the capabilities of network supervision and the traffic management equipment used. Known network supervision and traffic management equipment general comprises network probes, designed to monitor a data stream received via a communications network.

In practice, network probes are designed to process a fixed data stream and monitor specific measurements of these data. Consequently, whenever the data stream increases and/or a new measurement of the data stream is identified for monitoring, these network probes need to be redesigned to modify their processing capabilities in order to manage the modified data stream.

To mitigate the inefficiencies associated with hardware-based network probes, network supervision and traffic management software solutions are available that perform deep packet inspection (DPI) on only a few packets. This technical solution is known as packet sampling (i.e. taking packets entirely at random from a network flow to perform sampling). This known solution avoids high processing overloads and higher network latencies. However, such an former solution is not entirely satisfactory, as the analysis is carried out restrictively on protocol chains or communication sessions comprising five fixed fields (source field, destination field, source port, destination port, communication protocol). As a result, an analysis of this kind according to the prior art cannot be used to process protocol chains or sessions where the basis of identification is based on a 5-tuple value (source IP, destination IP, source port, destination port and application), or delayed detection tunnelling protocols, or layers 2 to 7 of the Open Systems Interconnection (OSI) model.

Another solution is also known, such as that presented in EP 1 788 490 A (APPTITUDE INC), teaching an architecture based on the implementation of a specific hardware part (FPGA and ASICs) and a software part involving packet slicing.

According to the solution described in EP 1 788 490 A, the payload or attached content of a protocol layer is at least partly held in memory first in the FPGA, before being delegated to the processor and RAM. The hardware architecture cannot retain the status of a session long enough. The system slows down dramatically when analysing a high throughput data stream and prevents protocols from being identified a posteriori. Furthermore, since the FPGA has limited memory, it has to clear its cache periodically, which results in the loss of information and data packets, and can lead to inaccurate analysis statistics. Moreover, using packet slicing, reassembly for analysis therefore incurs a risk of information loss. In addition, managing the table of digital fingerprints calculated on the basis of five tuples (source IP address/port number, destination IP address/port number and the protocol used) means that a session can be identified on the basis of a digital fingerprint calculation taking into account only one identification layer, whereas in the case of sessions built on several tunneled or multiplexed protocols, encapsulation creates several hidden sessions that cannot be identified with a 5-tuple. Furthermore, encryption of the communications adds variation that will also distort comparisons with a malware fingerprint database. Finally, the solution according to EP 1 788 490 takes account of the payload when calculating the hash, which will lead to too many variations in the analysis values to remain relevant for comparison purposes, and the 5-tuple calculation approach.

Moreover, at very high bit rates, the use of a 5-tuple method for calculating the digital fingerprint or hash, combining hardware techniques (FPGA or ASIC) and packet slicing (slicing the packet on the lower or upper layers) to speed up packet processing, leads natively to a loss of visibility and cascading errors.

In addition, the 5-tuple approach for two sessions that have the same 5-tuple, but the lower layer of which is different (i.e. a different virtual network) will be interpreted as if the two sessions are identical when they are not, resulting in a loss of information that can seriously affect the results of data analysis.

The term "hash" is used hereafter to refer to a calculated digital fingerprint.

The present invention remedies these drawbacks and improves the situation.

The present invention relates to a process for analysing a data stream of packets of data received via a communications network, wherein the data stream comprises batches of packets each defined by a chain of communication protocols attached to at least one session.

According to a general definition of the invention, the process comprises a protocol analysis according to the following steps:

analysing the first protocol Pi of a chain of communication protocols according to an explicit detection classification step configured to check whether the first protocol Pi announces the next communication protocol Pi+1 of the protocol chain:
  in the case of announcement, the next protocol Pi+1 thus announced is identified;
  whereas in the case of non-announcement, analysing the next protocol Pi+1 according to a session detection classification step;
analysing according to a session detection classification step, configured to check whether the protocol Pi+1 is attached to a known protocol chain according to a dynamic decision-making tree by querying a dynamic session database comprising identified protocol chains:
  in the case of attachment, the protocol Pi+1 is identified, and the protocol Pi+2 is analysed by repeating the explicit detection classification and session detection classification steps;
  whereas in the case of non-attachment, analysing the protocol Pi+1 according to a deep packet inspection classification step;
analysing the protocol Pi+1 according to a deep packet inspection classification step, configured to identify the packet communication protocol Pi+1 according to a dynamic decision-making tree correlated to a knowledge database comprising protocol analysis parameters and a database of markers specific to each known protocol; —in the case of failure to identify the protocol $P_{i+1}$, issuing a list of potential candidate protocols to be taken into account according to at least two detection branches, wherein each detection is attached to a sub-session determined to analyse the next protocol or protocols $P_{i+n}$ with $n \geq 2$ by repeating the explicit detection classification, session detection classification, and deep packet inspection classification steps until at least one protocol, the identity of which is certain, is identified;

if a protocol $P_{i+n}$, the identity of which is certain, is identified on a detection branch, retrospectively validating the detection branch, and discarding the remaining non-validated detection branches;

in the case of failure to identify a protocol $P_{i+n}$, the identity of which is certain, on a detection branch, retrospectively classifying the protocol $P_{i+1}$ as unknown; and associating a label with the data packets according to each session for which the protocols have been identified.

It should be noted that the analysis of the binary characteristics of each packet of a communication session (or protocol chain) is carried out according to the invention until it is possible (or impossible) to determine (identify) the protocol used in this session.

An approach of this kind according to the invention has the advantage of allowing a higher labelling rate than prior approaches, since it can be carried out from layer 2 to layer 7 of the OSI model, in a single packet analysis pass. It can also be used to identify protocol chains in the case of tunnelling protocols, or delayed detection protocols, as well as continuous detection. Even if a protocol is not identified immediately, detection of the subsequent protocols continues.

Furthermore, owing to the use of the dynamic session database storing previously identified communication sessions, the present invention is faster than prior solutions based on an inspection of all packets.

According to another aspect of the invention, the method also comprises, after each classification step, a step of calculating a digital session fingerprint from a chosen hash function, said digital session fingerprint being calculated on the basis of the first protocol identified, and on the previously calculated digital fingerprint of the protocol chain already identified without taking account of the attached content, wherein each digital fingerprint is calculated on the basis of chosen parameters (or tuple) specific to each type of protocol, each type of protocol having its own number of defined markers; and a step of saving the digital session fingerprint calculated after each protocol identification step following the step of classifying each protocol by deep packet inspection or after the retrospective validation step, in a hash table integrated into the dynamic session database, wherein each digital fingerprint is linked to at least one chosen session, said digital fingerprints calculated after each step of classifying each protocol by deep packet inspection being able to be updated retrospectively in the event of delayed identification of a protocol according to the checking step.

Advantageously, the Applicant has observed that the dynamic management of digital fingerprints according to the invention enables the digital fingerprint of a non-validated protocol to be updated a posteriori, since it evolves as the packet is read.

This unique algorithm makes it possible to detect all types of protocol with a single probe, including but not limited to simple, complex, tunneled and multiplexed protocol sequences.

The management of digital fingerprints in the method according to the invention also has the advantage of dispensing with a protocol chain slicing step, thereby eliminating the risk of losing information, and also makes it possible to obtain genuinely unique identifiers in the protocol chain, regardless of the length of the said protocol chain that makes up the packet or packets.

In practice, when tunneled, multiplexed or multi-channel protocols are detected with certainty, the method according to the invention comprises the following sub-steps:

Generating at least one detection branch per verified protocol to be taken into account for subsequent detection, Calculating a digital session fingerprint from a hash function chosen for each detection branch, wherein each detection branch is attached to a sub-session determined to analyse the next protocol(s) $P_{i+n}$; and Saving the digital session fingerprint of each detection branch attached to a protocol chain, wherein the saving step is configured to assign a unique identifier to each detection branch of the detected tunneled, multiplexed or multi-channel protocol(s).

Advantageously, the method according to the invention makes it possible to obtain a unique digital fingerprint per channel, or branch of protocols detected, and thus avoid a loss of information such as two channels having the same identifier.

For instance, the hash table is updated if the detection of at least one protocol of a session requires the implementation of delayed detection on several packets.

In practice, the knowledge database comprises a static knowledge database, wherein the static knowledge database comprises markers based on empirical knowledge of the characteristics of the protocols, and wherein the empirical knowledge comprises algorithmic means of detecting protocols based on location standards, logical links between communication protocols, requests for comments and frequency models of communication protocols.

Furthermore, the method according to the invention comprises performing a data analysis followed by a data extraction for the data packets based on the associated label.

According to a first embodiment of the invention, the protocol analysis, and the analysis and extraction of the data for a data packet are performed dynamically on a single processing core of a multi-core processor.

According to a second embodiment of the invention, the analysis and the extraction of the data for the data packet are performed on several processing cores of a multi-core processor.

In practice, the method according to the invention comprising separating the data stream into a plurality of processing queues wherein protocol analysis followed by analysis and extraction of the data is performed on data packets in each of the processing queues.

Furthermore, the separation of the data stream into the plurality of processing queues is based on an RSS receive side scaling algorithm.

According to one embodiment of the method according the invention, the protocol analysis is performed dynamically on layers 2 to 7 of the OSI layer model.

The invention also relates to an IT system for analysing a data stream of batches of packets received via a communications network, wherein the data stream comprises batches of packets each defined by a chain of communication protocols attached to at least one session.

According to another general definition of the invention, the system comprises a processor comprising at least one processing core for processing a predetermined number of data packets per minute and a protocol analysis engine on the at least one processing core, wherein protocol analysis the engine:

analyses the first protocol of a chain of communication protocols according to an explicit detection classification step configured To check whether the first protocol announces the next communication protocol of the protocol chain, in the case of announcement, the next protocol thus announced is identified, whereas in the case of non-announcement, the analysis engine is capable of analysing the protocol according to a session detection classification step;

analyses according to a session detection classification step, configured to check whether the protocol Pi+1 is attached to a known protocol chain according to a dynamic decision-making tree by querying a dynamic session database comprising identified protocol chains:

in the case of attachment, the protocol Pi+1 is identified, and the analysis engine is capable of analysing the protocol Pi+2 by repeating the explicit detection classification and session detection classification steps;

whereas in the case of non-attachment, the analysis engine is capable of analysing the protocol Pi+1 according to a deep packet inspection classification step;

analyses the protocol Pi+1 according to a deep packet inspection classification step, configured to identify the packet communication protocol Pi+1 according to a dynamic decision-making tree correlated to a knowledge database comprising protocol analysis parameters and a database of markers specific to each known protocol;

in the case of failure to identify the protocol Pi+1, the analysis engine is capable of issuing a list of potential candidate protocols to be taken into account according to at least two detection branches, wherein each detection is attached to a sub-session determined to analyse the next protocol or protocols Pi+n with n≥2 by repeating the explicit detection classification, session detection classification, and deep packet inspection classification steps until at least one protocol, the identity of which is certain, is identified;

if a protocol Pi+n, the identity of which is certain, is identified on a detection branch, the analysis engine is capable of retrospectively validating the detection branch, and discarding the remaining non-validated detection branches;

in the case of failure to identify a protocol Pi+n, the identity of which is certain, on a detection branch, the analysis engine is capable of retrospectively classifying the protocol Pi+1 as unknown; and a labelling engine capable of associating a label with the data packets as a function of the protocols thus identified.

In practice, the protocol analysis engine:

calculates a digital session fingerprint from a hash function chosen after each classification step, said digital fingerprint being calculated on the basis of the first protocol identified, and on the previously calculated digital fingerprint of the protocol chain already identified without taking into account the attached content, wherein each digital fingerprint is calculated on the basis of chosen parameters (or tuple) specific to each type of protocol, each type of protocol having its own number of defined markers (n-Tuples);

records the digital session fingerprint calculated after each protocol identification step following each deep packet inspection protocol classification step or after the retrospective validation step, in a hash table integrated into the dynamic session database, each digital fingerprint being linked to at least one selected session, said digital fingerprints calculated after each deep packet inspection protocol classification step being capable of being retrospectively updated in the event of delayed identification of a protocol according to the checking step.

The protocol analysis engine of the system according to the invention, when tunneled, multiplexed, multi-channel or multiplexed multi-channel protocols are detected with certainty, also Generates at least one detection branch per verified protocol to be taken into account for subsequent detection, Calculates a digital session fingerprint from a hash function chosen for each detection branch, wherein each detection branch is attached to a sub-session determined to analyse the next protocol(s); and Saves the digital session fingerprint of each detection branch attached to a protocol chain, wherein the saving is configured to assign a unique identifier to each detection branch of the detected tunneled, multiplexed or multi-channel protocol(s).

The system according to the invention furthermore comprises a knowledge database including a static knowledge database, wherein the static knowledge database comprises markers, also known as labels, based on empirical knowledge of the characteristics of the protocols, and wherein the empirical knowledge comprises algorithmic means of detecting protocols based on location standards, logical links between communication protocols, requests for comments and frequency models of communication protocols.

In practice, the system according to the invention comprises a content analysis engine executable on at least one processing core to analyse and extract the data packet based on the associated label.

According to one embodiment of the invention, the protocol analysis engine and the content analysis engine consecutively perform protocol analysis followed by data analysis and extraction for the data stream of data packets, and wherein the content analysis engine separately performs data analysis and extraction for differently labelled data packets.

The system according to the invention furthermore comprises a network interface card coupled to the processor, wherein the network card separates the data stream of data packets into a plurality of processing queues, and wherein the protocol analysis engine and the content analysis engine perform packet analysis and packet data extraction on each of the plurality of processing queues.

For instance, the network interface card (NIC) separates the data stream of data packets according to the RSS receive side scaling algorithm.

The method and system according to the invention advantageously allow the identification of protocol layers that have not been announced. In the case where these protocols do not announce themselves, or do not announce those that follow, and make it possible to search for a set of markers capable of validating the identification of a particular protocol.

Advantageously, the system and method according to the invention also enable validation of the analysed protocols by multiple and logical rebounds if a layer declared as "secure"

is validated, said "secure" layer thus enabling validation of all the classification choices made. In other words, the preceding protocol stacks can be correctly deduced.

Surprisingly, the method and system according to the invention make it possible to wait for several packets in order to validate a chain of protocol stacks for a given session, and to maintain session uniqueness per branch while guaranteeing a unique digital fingerprint per session and per detection branch by performing continuous digital fingerprint calculations on each protocol layer contained in a packet.

Finally, the method and system according to the invention make it possible to maintain very deep granularity in the analysis of network data, thereby limiting protocol identification errors and guaranteeing reliable analysis data.

Other advantages and characteristics of the invention will appear on examination of the description and drawings.

DETAILED DESCRIPTION

The above techniques are described in greater detail with reference to FIGS. 1 to 18. It should be noted that the description and numbers merely illustrate the principles of this object and the examples described in this document and should not be interpreted as limited to this object. It is therefore understood that a variety of arrangements may be devised which, although not explicitly described or shown in this document and in the following statements outlining principles, aspects and implementations of this object, together with specific examples thereof, are intended to encompass equivalents thereof.

Figure 1:
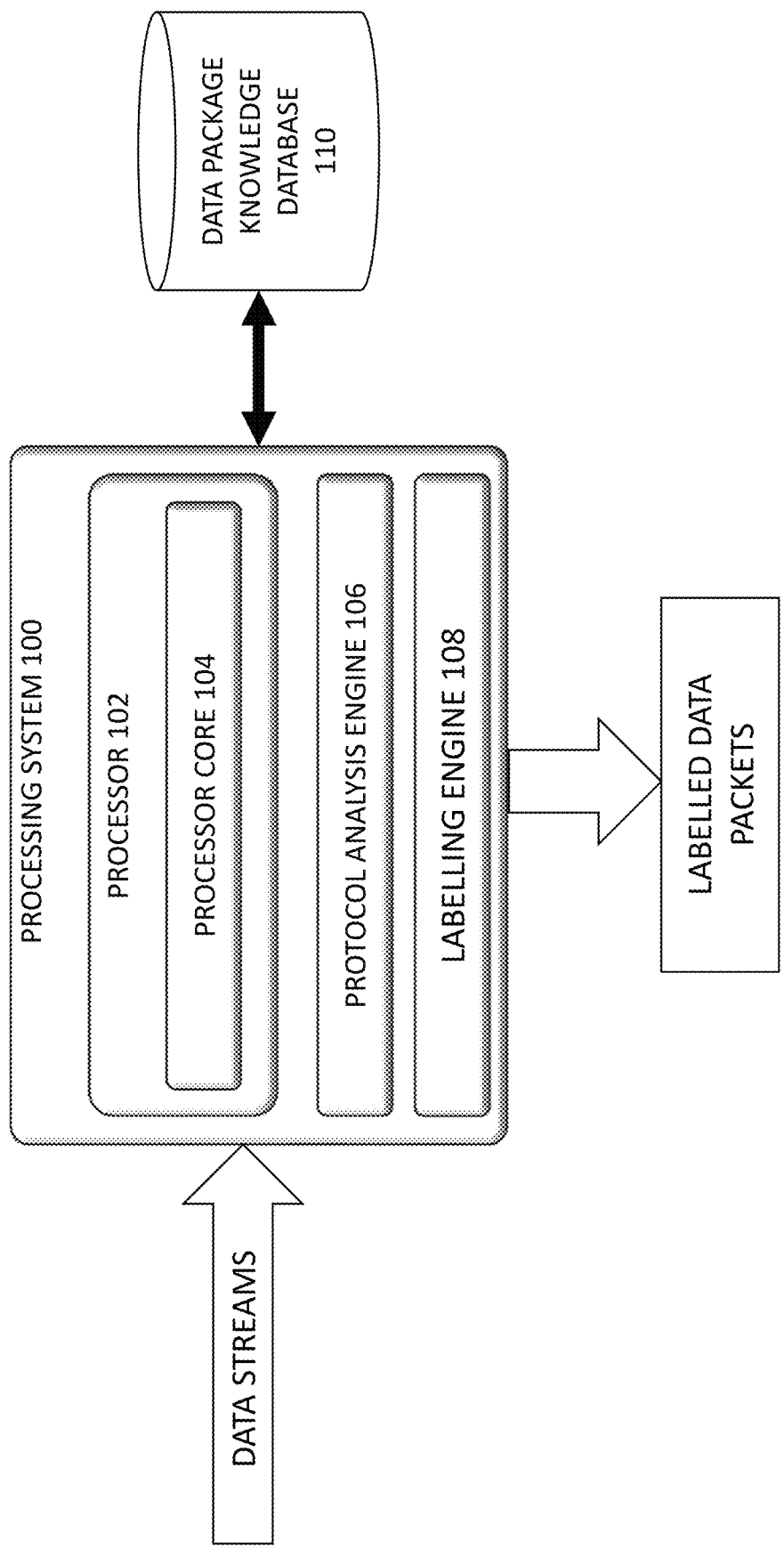
FIG. 1 illustrates an IT system for analysing a data stream of data packets received via a communications network, according to an example of embodiment of the present invention.

FIG. 1 illustrates an IT system 100 for analysing a data stream of data packets received via a communications network (not illustrated), according to an example of the present invention. The IT system 100 can be either a standalone computer or a combination of several IT systems operating together in a distributed IT environment. Examples of an IT system 100 may include, but are not limited to, desktops, laptops and smartphones, as well as personal digital assistants (PDAs).

The communications network can be a wireless or wired network, or a combination of these. The communications network can be a set of individual networks, interconnected with each other and functioning as a single large network. Examples of such individual networks include, but are not limited to, the Global System for Mobile Communications (GSM) network, the Universal Mobile Telecommunications System (UMTS) network, the Long Term Evolution (LTE) network, the Personal Communications Services (PCS) network, the Time Division Multiple Access (TDMA) network, the Code Division Multiple Access (CDMA) network, the Next Generation Network (NGN), the Public Switched Telephone Network (PSTN) and the Integrated Services Digital Network (ISDN). According to the terminology, the communications network comprises various network entities, such as gateways and routers; however, these details have been omitted for the sake of brevity of the description.

It should be noted that, although the following provisions are made with respect to the IT system 100, the exemplary embodiments of the present invention may also be applied to various devices or networks used by a network service provider offering network connectivity to one or more subscribers, such as government organisations, multinational corporations, companies, businesses and other institutions. The network service provider can act as a connection channel between the communications network and its subscribers' IT devices. It should be noted that the network service provider may deploy various other equipment items, devices, network nodes interconnected by one or more wired or wireless network links to provide network connectivity to subscribers. Network nodes may typically include switches, routers, access points and data links capable of facilitating communication between various subscriber hosts (e.g. server computers, client computers, mobile devices, etc.) that can generate and consume data traffic. In another example, the exemplary embodiments may be deployed on various network peripherals used by individual institutions/organisations, providing network connectivity and security to one or more of its users.

With reference to FIGS. 1 to 18, the IT system 100 may include a processor 102, when the processor 102 comprises at least one processing core 104. The IT system 100 may furthermore comprise a protocol analysis engine 106 and a labelling engine 108. In one example, the protocol analysis engine 106 and the labelling engine 108 may be executable on at least one processing core 104.

The term "analysis engine 106" will be used to refer to the term "protocol analysis engine 106".

The processor 102 comprises at least one processing core 104 configured to process a predetermined number of data packets per minute and a protocol analysis engine 106 on at least one processing core 104.

In an exemplary embodiment, the protocol analysis engine 106 analyses the data stream comprising batches of packets each defined by a chain of communication protocols attached to at least one session. Said protocol analysis engine 106 is configured to analyse the first protocol Pi of a chain of communication protocols according to an explicit detection classification S10, S11, S12, S13 to check whether said first packet Pi announces the next data packet communication protocol Pi+1 of the protocol chain.

In the case of announcement, the next packet protocol, thus announced, is identified S100.

In the case of non-announcement, the analysis engine 106 is able to analyse the next packet Pi+1 to check whether it is attached to a known protocol chain stored in the dynamic database BDDS comprising already identified protocol chains, according to a session detection classification S20, S21, S22.

The protocol analysis engine 106 is configured to apply a session detection method S20 involving checking whether the protocol Pi+1 is attached to a known protocol chain according to a dynamic decision-making tree by querying a dynamic session database BDDS comprising identified protocol chains.

In practice, the IT system 100 is also coupled to the data packet knowledge database 110 comprising a dynamic step BDDS for storing sessions, as will be described in more detail below, and a step BDC for storing knowledge relating to protocols. It should be noted that while the data packet knowledge database 110 has been illustrated as thus separate from the IT system 100, the data packet knowledge database 110 may also be hosted within the IT system 100 depending on its capabilities.

In the case of attachment, the protocols of the known protocol chain are identified (step S100), the protocol Pi+1 is identified, and the analysis engine 106 is capable of analysing the protocol Pi+2 by repeating the steps of explicit detection classification S10 and session detection classification S20.

In the case of non-attachment, the analysis engine 106 is capable of analysing the next protocol Pi+1 according to a deep packet inspection classification S40, S42, S44, S46.

According to a deep packet inspection classification S40, the analysis engine 106 is configured to identify the packet communication protocol Pi+1 according to a dynamic decision-making tree correlated to a knowledge database BDC comprising protocol analysis parameters and a database of markers, also called labels (see FIG. 11 and FIG. 15) specific to each known protocol.

If the protocol Pi+1 is not identified, the analysis engine 106 is capable of issuing a list of potential candidate protocols to be taken into account according to at least two possible detection branches, each detection being attached to a sub-session determined to analyse the next protocol or protocols Pi+n with n≥2 by repeating the analyses according to the classification by explicit detection S10, by session detection S20, and by deep packet inspection S40 until at least one protocol, the identity of which is certain, is identified.

If a protocol Pi+n, the identity of which is certain, is identified by the analysis engine 106, on a detection branch, said analysis engine 106 is capable of retrospectively validating S60 the detection branch, and discarding the remaining non-validated detection branches.

In the case of failure to identify a protocol Pi+n, the identity of which is certain, on a detection branch, the analysis engine 106 is capable of retrospectively classifying the protocol Pi+1 as unknown and of continuing the analysis of the next data packets.

The protocol analysis engine 106 is furthermore capable of calculating a digital session fingerprint Hi+n from a hash function chosen after each classification step S10, S20, S40, said digital fingerprint Hi+n being calculated on the basis of the first protocol identified, and on the previously calculated digital fingerprint Hi+n−1 of the protocol chain already identified without taking into account the attached content or payload.

Each digital fingerprint Hi+n is thus calculated on the basis of selected parameters or tuples specific to each type of protocol, wherein each type of protocol has its own defined number of tuples, i.e. n-Tuples.

For each protocol, the relevant parameters are selected dynamically, enabling complete sessions to be managed excluding TCP/UDP.

The analysis engine 106 is subsequently capable of saving the digital session fingerprint Hi+n calculated after each protocol identification step following step S40 or after the retrospective validation step S60, in a hash table integrated into the dynamic session database BDDS, each digital fingerprint Hi+n being linked to at least one selected session, said digital fingerprints Hi+n calculated after each deep packet inspection protocol classification step S40 being capable of being retrospectively updated in the event of delayed identification of a protocol according to the checking step S60.

In practice, when the analysis engine 106 does not identify a protocol Pi+1, and issues a list of potential candidate protocols to be taken into account according to at least two possible detection branches B1, B2 for delayed detection, each detection being attached to a sub-session determined to analyse the next protocol or protocols Pi+n with n≥2 by repeating the analyses according to the classification by explicit detection S10, by session detection S20, and by deep packet inspection S40 until at least one protocol the identity of which is certain, is identified, the analysis engine 106 calculates a digital session fingerprint Hi+n from a chosen hash function, for each detection branch B1, B2 being attached to a sub-session determined to analyse the next protocol or protocols Pi+n.

The digital session fingerprints Hi+n calculated in this way enable one or more previously unidentified protocols to be identified a posteriori. Even if several packets are needed to detect the session, the hash table can be updated to take these new elements into account, so that a single packet or associated data is never lost.

In addition, the analysis engine 106 records the digital session fingerprint Hi+n of each detection branch B1, B2 attached to a protocol chain, wherein the saving is configured to assign a unique identifier to each detection branch.

Figure 8:
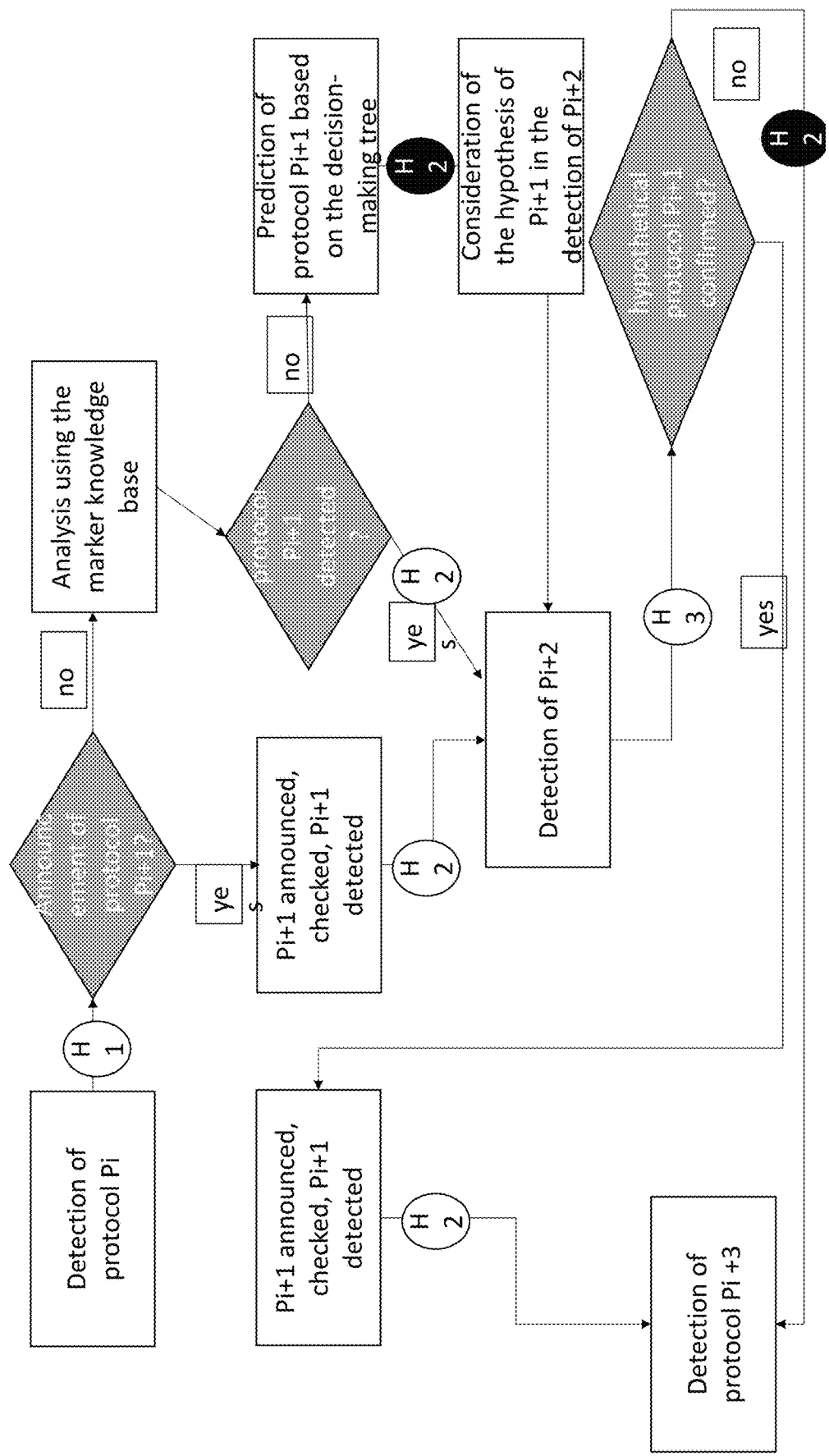

With reference to FIG. 8, for instance, the digital fingerprints H1, H2, and H3 are calculated respectively after identification of the protocols Pi, Pi+1 and Pi+2 of the protocol chain, and when the deep packet inspection classification S40 fails to identify the protocol Pi+1, a digital fingerprint H2T is calculated, and in the event that the identification of the protocol Pi+3 validates the protocol chain, and Pi+1 can be deduced, then Pi+1 is validated and the digital fingerprint H2T is updated by calculating and saving a new digital fingerprint H2.

According to one particular embodiment of the invention, the analysis engine 106, in the event of detection of tunneled, multiplexed or multi-channel protocols detected with certainty, is capable of generating at least one detection branch A1, A2, B1, B2, C1, C2 per verified protocol to be taken into account for subsequent detection.

For each detection branch generated A1, A2, B1, B2, C1, C2, the analysis engine 106 calculates a digital session fingerprint Hi+n from a chosen hash function, each detection branch being attached to a sub-session determined to analyse the next protocol or protocols Pi+n; and Saves the digital session fingerprint Hi+n of each detection branch attached to a protocol chain, wherein the saving is configured to assign a unique identifier to each detection branch of the detected tunneled, multiplexed or multi-channel protocol(s).

Advantageously, the calculated hash evolves as the data packet is read, making it possible to analyse and detect all the protocols with a single probe (i.e. simple, complex, tunneled, multi-channel and multiplexed sequences), and owing to this hash calculation repetition, on each layer, each of the identifiers is genuinely unique, regardless of the length of the protocol chain that makes up the packet(s).

The system 100 furthermore comprises a labelling engine 108, capable of associating a label with the data packets as a function of the protocols thus identified.

The analysis engine 106 is capable of saving the session status if the current session is unknown with a digital fingerprint calculated with n-tuples S31, 32 and S33.

Figure 2:
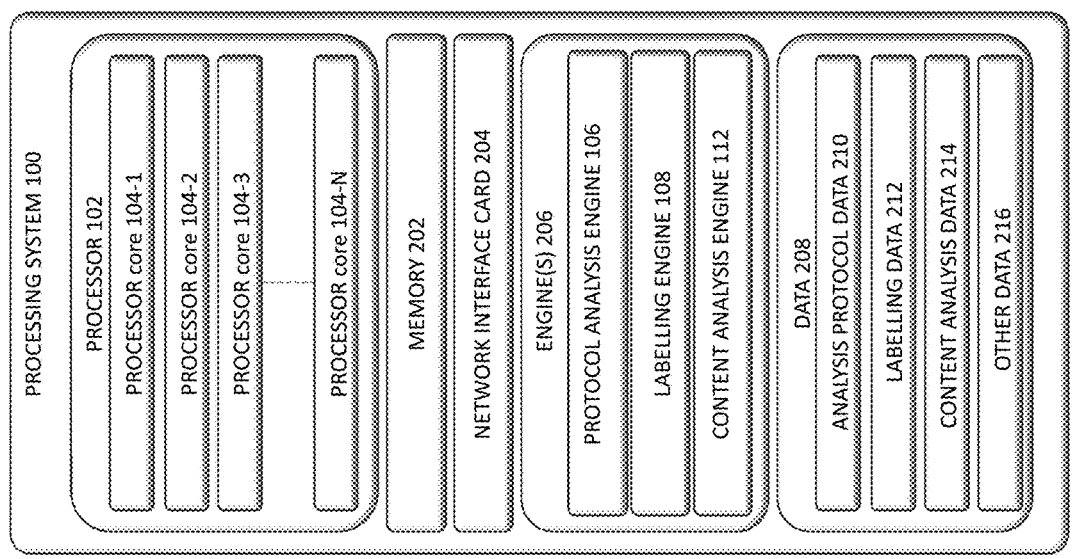
FIG. 2 illustrates the IT system diagrams, according to an example of embodiment of the present invention.

FIG. 2 illustrates the diagrams of the IT system 100 for analysing a data stream of data packets received via a communications network, according to an example of embodiment of the present invention.

As already described, the IT system 100 may include the processor 102, or the processor 102 may include multiple processing cores 104-1, 104-2, 104-3, . . . , 104-n. The functions of the functional block labelled as "processor(s)", may be provided through the use of dedicated hardware as well as hardware capable of executing instructions. When provided by a processor, functions may be provided by a single dedicated processor, by a single shared processor, or by a plurality of individual processors, some of which may be shared. Furthermore, the explicit use of the term "processor" shall not be construed as referring exclusively to hardware capable of executing instructions, and may implicitly include, without limitation, Digital Signal Processor (DSP) hardware, the network processor, the Application Specific Integrated Circuit (ASIC), the FPGA (Field Programmable Gate Array), the Read Only Memory (ROM) for storage of the instructions, the Random Access Memory (RAM), and the non-volatile memory. Other hardware, conventional and/or customised, can also be included.

The IT system 100 may furthermore include a memory 202 coupled to the processor 102, wherein the memory 202 may include any computer-readable medium, including, for example, volatile memory (e.g. RAM) and/or non-volatile memory (e.g. EPROM, flash memory, etc.).

In addition, the IT system 100 may include a network interface card (NIC) 204 coupled to the processor 102 and to the memory 202. The network interface card 204 may be an integrated component of the IT system 100 or can be a separate component externally coupled to the IT system 100.

The IT system 100 may furthermore include the engines 206, wherein the engines 206 may include a protocol analysis engine 106, the labelling engine 108 or the content analysis engine 112. In one example, the motors 206 can be implemented as a combination of hardware and firmware. In the examples described here, such combinations of hardware and firmware can be deployed in a number of different ways. For example, the engine firmware may consist of executable processor instructions stored on a non-transitory machine-readable storage medium and the engine hardware may include a processing resource (e.g. implemented as a single processor or a combination of several processors) to execute these instructions.

In the present examples, the machine-readable storage medium may store instructions which, when executed by the processing resource, implement the engine functionalities. In such examples, the IT system 100 may include the machine-readable storage medium storing the instructions and the processing resource for executing the instructions. In other examples of this object, the machine-readable storage medium may be situated at a different location, accessible however to the IT system 100 and to the processor 102.

The IT system 100 may furthermore include the data 208 that serve, among other aspects, as a frame of reference for storing data that can be recovered, processed, received or generated by the protocol analysis engine 106, the labelling engine 108 or the content analysis engine 112. The data 208 may include the protocol analysis data 210, the labelling data 212, the content analysis data 214 and other data 216. In one example, the data 208 can be stored in the memory 202.

In an exemplary implementation, the network card 204 can receive the data stream of data packets via the communications network. The network card 204 can separate the data stream into multiple processing queues RX and allocate each processing queue to at least one processing core 104-1, 104-2, 104-3, . . . , 104-n. In one example, the network card 204 can separate the data stream into the multiple processing queues based on the RSS (Receive Side Scaling) algorithm. Such an algorithm allows packets to be distributed over several queues Psa, Psb (reception queues). There are several distribution algorithms, the most widely used of which is Microsoft's "Toeplitz" (registered trademark).

It should be noted that each of the multiple processing cores 104-1, 104-2, 104-3, . . . , 104-n may allow different instances of the multiple engines to be executed thereon. For example, separate instances of the protocol analysis engine 106, the monitoring engine 108 and the correction engine 112 may be executed in parallel on each of the multiple processing cores 104-1, 104-2, 104-3, . . . , 104-n. However, for ease of understanding, the following example of implementation has been described with respect to a single processing core 104-1 of the processor 102, hereinafter referred to as the processing core 104.

Figure 5:
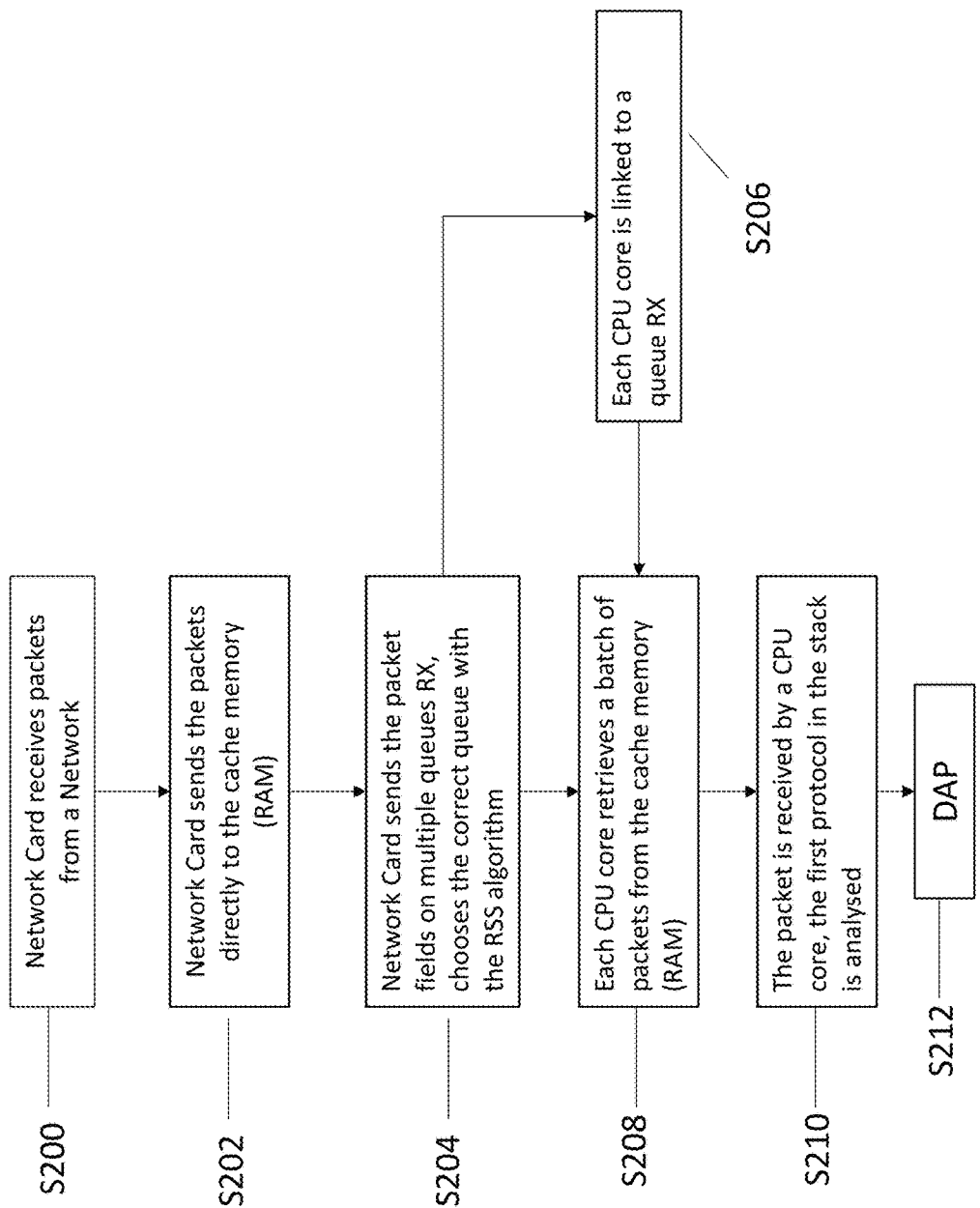
FIG. 5 illustrates the step of receiving and distributing packets via a network interface card according to the invention.

With reference to FIG. 5, an example of reception and distribution of packets is represented.

The network card 204 receives the packets according to step S200.

According to step S202, the network card sends the packets directly to the cache memory 202.

According to step S204, the network card sends the packet fields to multiple queues RX and selects the correct queue according to the RSS (Receive Side Scaling) algorithm.

According to step S206, each CPU core is linked to a queue RX.

According to step S208, each CPU core retrieves a batch LOT of packets from the cache memory (RAM) 202.

According to step S210, the packet Pn is received by a CPU core, the first protocol in the protocol chain (or stack) is analysed according to the DAP analysis (S212) according to the invention.

In one example, the dynamic session packet database BDDS can be stored in the protocol analysis data 210. In another example, the database BDDS can be included in the data packet knowledge database 110.

In this example, in addition to the dynamic session database BDDS, the data packet knowledge database 110 may also include a static data packet database. The static data packet database may comprise markers based on empirical knowledge of the characteristics of the protocols, and wherein the empirical knowledge comprises algorithmic means of detecting protocols based on location standards, logical links between communication protocols, requests for comments RFC and frequency models of communication protocols.

The protocol analysis engine 106 can also store the communication protocol thus identified in the labelling data 212. The labelling engine 108 can subsequently access the labelling data 212 and associate a label with the data packets thus analysed, the protocols of which are thus identified.

The labelling engine 108 subsequently transmits the labelled data packets to the content analysis engine 112. The content analysis engine 112 analyses and extracts the data packets according to the data label associated with them. For example, the content analysis engine 112 can analyse and extract a first data packet with a label indicating a first communication protocol based on the first communication protocol. Similarly, the content analysis engine 112 can analyse and extract a second data packet with the label indicating a second communication protocol different from the first data packet. The protocol analysis engine 112 can subsequently store the data packets analysed and extracted in the content analysis data 214.

In one example, the content analysis engine 112 can analyse and extract data packets (or metadata from said packets) to monitor and visualise data traffic, detect a reduction in the of service, detect cyber attacks and identify any inconsistencies in network configuration. If the content analysis engine 112 detects any of the above events based on the analysis and extraction of data, the content analysis engine 112 may generate a trigger indicating the occurrence of the event when analysing the data and extracting a set of data packets from the data stream. Under such circumstances, all the data packets can be stored for further processing. In one example, all the data packets can be stored in the other data 216.

Figure 3:
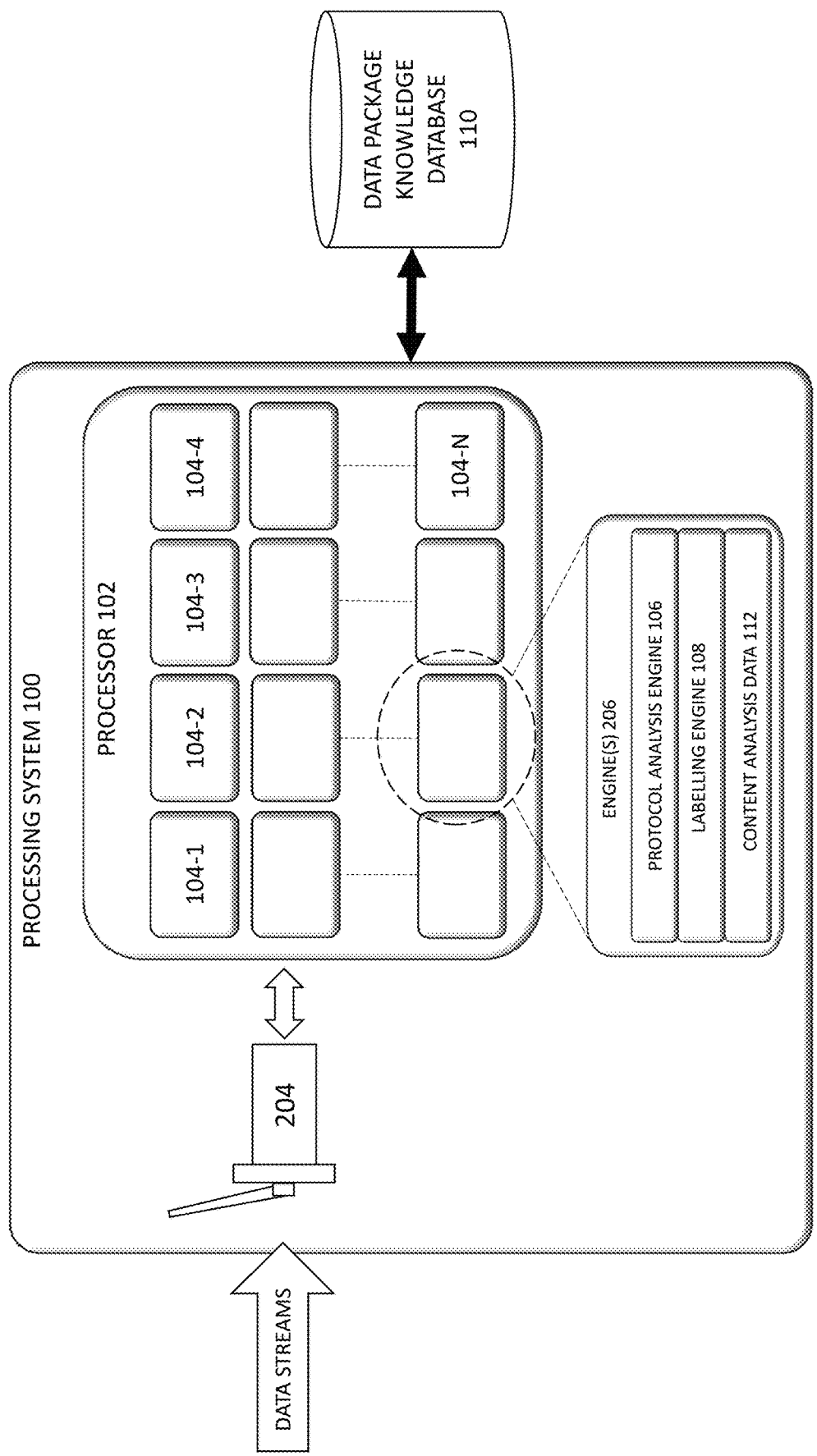
FIG. 3 illustrates the IT system for analysing a data stream of data packets received via a communications network, according to an example of embodiment of the present invention.

FIG. 3 illustrates the IT system 100, according to another example of embodiment of the present invention. As already described, the IT system 100 may include the processor 102 having multiple processing cores 104-1, 104-2, 104-3, ..., 104-n. The IT system 100 may furthermore include the network card 204 coupled to the processor 102 and the multiple processing cores 104-1, 104-2, 104-3, ..., 104-n included therein. In addition, each of the multiple processing cores 104-1, 104-2, 104-3, ..., 104-n may enable separate instances of the protocol analysis engine 106, the labelling engine 108, and the content analysis engine 112 to be executed. In addition, the IT system 100 can be coupled to the data packet knowledge database 110.

The content analysis engine 112, executed on the processing core 104-1, can subsequently analyse and extract the first data packet according to the data label associated with it.

Figure 6:
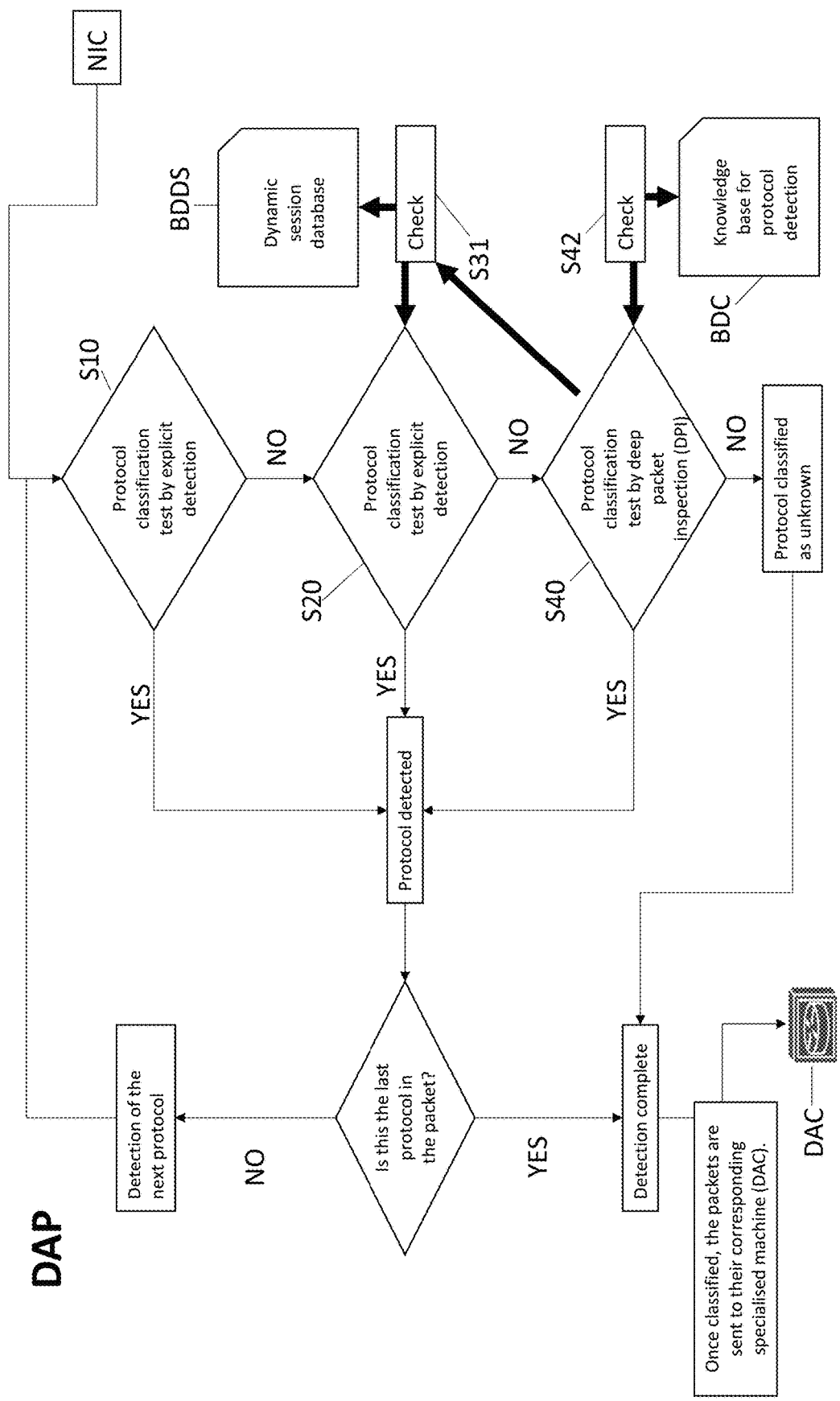
FIGS. 6, 7 and 8 illustrate the steps for analysing a data stream of data packets received via a communications network, according to an example of embodiment of the present invention.
Figure 7:
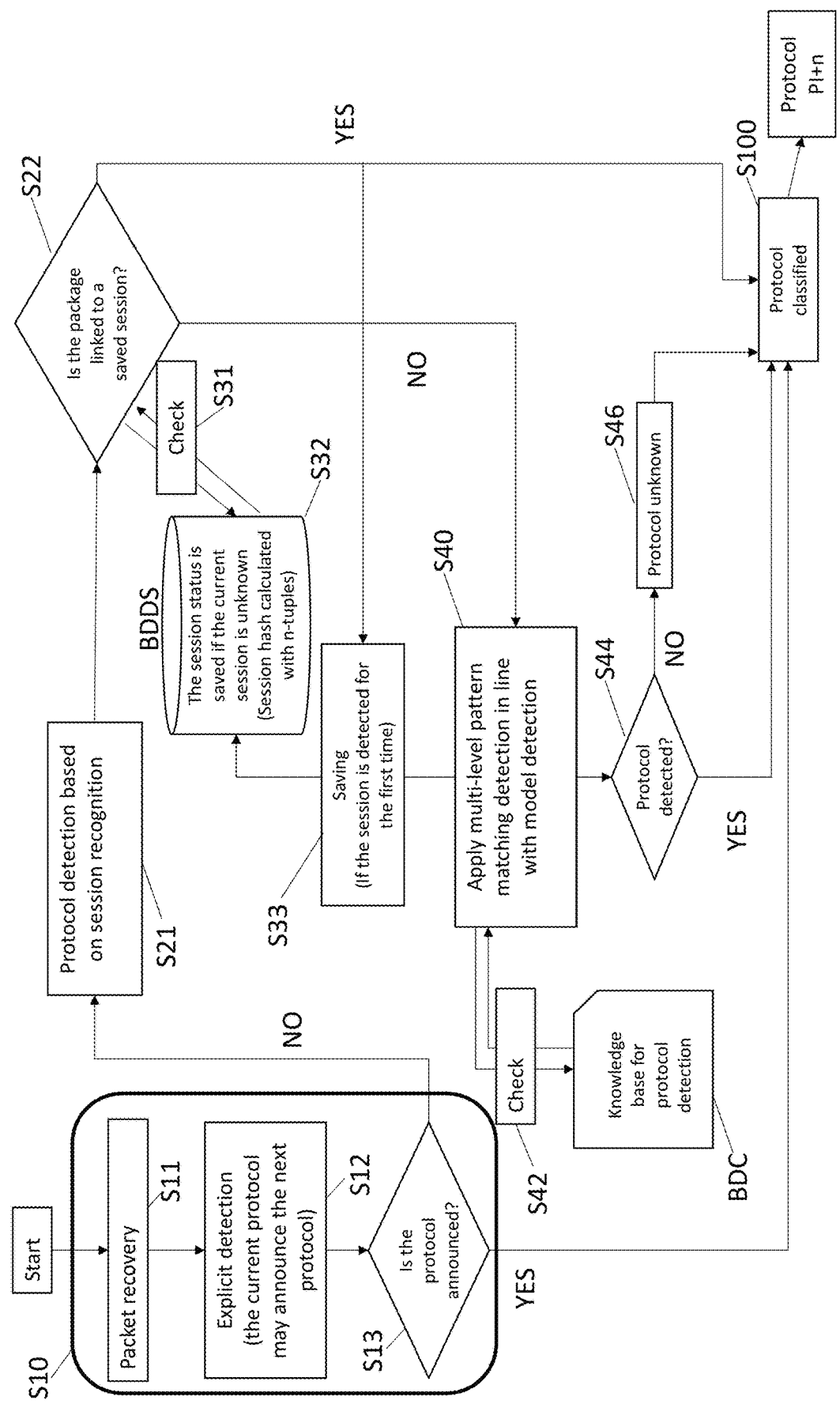

In one example, the protocol analysis engine 106 and the content analysis engine 112 may sequentially perform DAP protocol analysis as illustrated in FIGS. 6 and 7, followed by DAC data analysis and extraction for the data stream received via the communications network. For example, once the protocol analysis engine 106 has identified the communication protocol for the first data packet, the first data packet can be labelled and transmitted to the content analysis engine 112 for data analysis and extraction.

Alternatively, while the protocol analysis engine 112 is analysing and extracting data on the first data packet Pn, the protocol analysis engine 106 can simultaneously begin performing the DAP analysis for a second data packet Pn+1 following the first data packet in the data stream Pn.

In practice, the execution of the DAP analysis can be followed sequentially by the DAC data analysis and extraction for the data packets on a single processor core.

Alternatively, the DAP analysis and DAC extraction of the data that follows the DAP analysis can be processed in parallel on one or more cores or dedicated machines, facilitating scalability to handle a higher data stream received from the communications network. Thus, the techniques described above can facilitate the processing of data streams with data traffic in excess of 100 Gbps.

Figure 4:
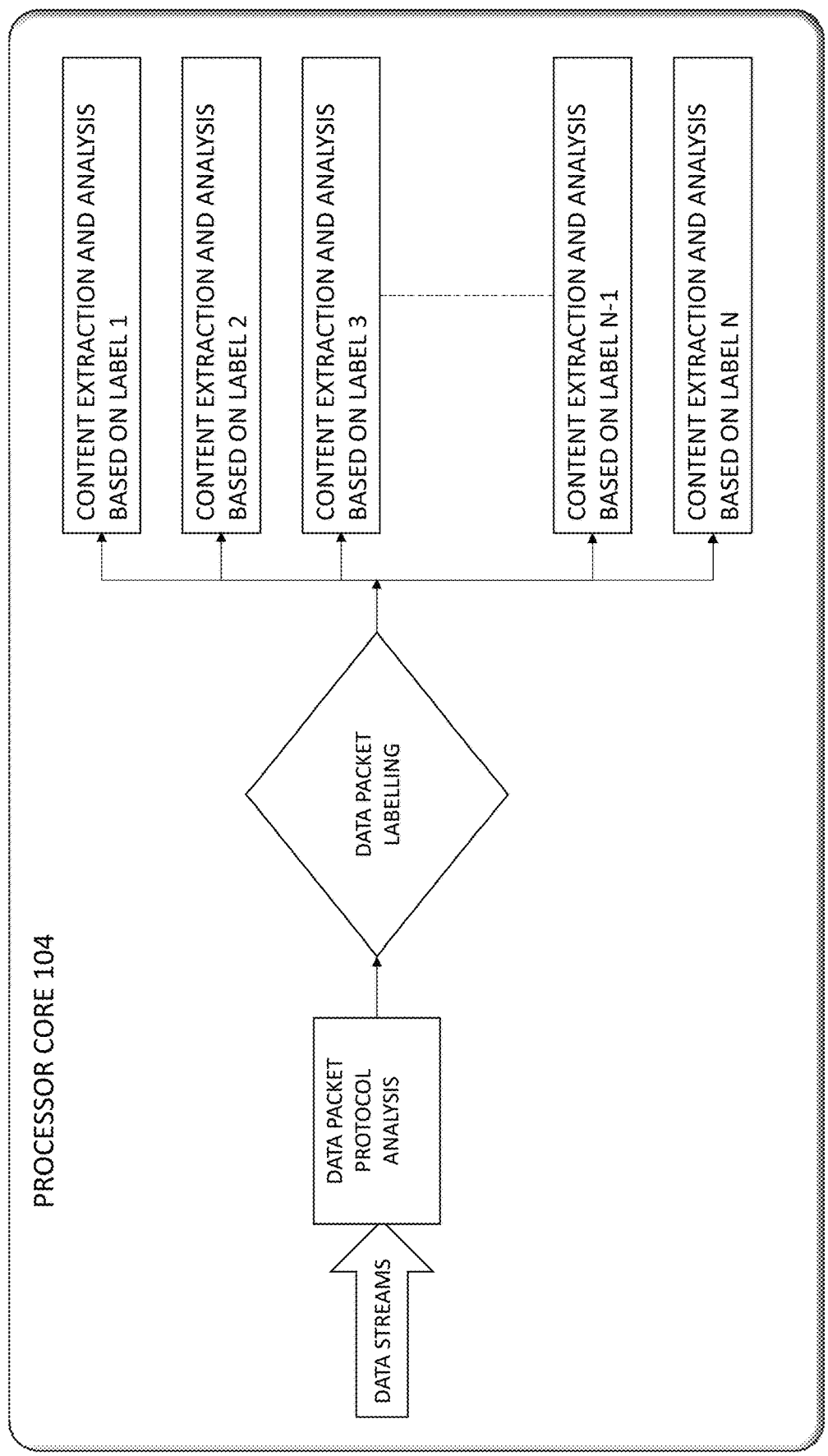
FIG. 4 illustrates the flow of events within a processing core of the IT system, according to an example of embodiment of the present invention.

In another example, as illustrated in FIG. 4, an instance of the protocol analysis engine 106 as well as several instances of the content analysis engine 112 may be executed on the processing core 104-1. In other words, once the protocol analysis engine 106 has performed DAP analysis on the data packets in the data stream and identified the communication protocol for the data packets, the processing core 104-1 may allow multiple instances of the content analysis engine 112 to run in parallel to process data packets based on different labels associated with the data packets, where the different labels are associated based on the communication protocol identified for the data packets in the data stream.

In practice, a single processor core consecutively processes the DAP protocol analysis followed by the DAC content analysis and extraction.

With a view to scalability, it is possible to dedicate cores, complete processors or dedicated machines, the purpose of which is to run several DACs, in cases where the analysis and extraction of metadata are too cumbersome to be carried out on a single processor core In this manner, several data packets with different associated labels can be processed in parallel by the processing core 104-1, thus increasing the overall throughput of data packets analysed and extracted by the IT system 100 in a given period of time.

Alternatively, designing a solution based on asynchronous, two-stage packet processing (DAP on the one hand and DAC on the other) enables a physical break to be made, separating DAP processing from DAC processing (in this case, DAC processing follows DAP processing for the same data packet). Based on the user's requirements, the resources allocated to the DACs may become congested. This break makes it possible to dedicate certain cores to a single DAC task. In addition to the cores of a single CPU processor, it is now possible to dedicate entire processors to the DAC, or even entire machines.

With reference to FIGS. 6 to 18, the invention also relates to a process for analysing a data stream of data packets received via a communications network, wherein the data stream comprises batches of packets each defined by a chain of communication protocols attached to at least one session.

The method according to the invention comprises a DAP protocol analysis according to a first step of analysing the first protocol Pi of a chain of communication protocols according to an explicit detection classification step S10 configured to check whether the first protocol Pi announces the next communication protocol Pi+1 of the protocol chain.

In practice, in the case of announcement, the next protocol Pi+1 thus announced is identified, whereas in case of non-announcement, the process according to the invention is configured to analyse the next protocol Pi+1 according to a session detection classification step S20.

The session detection classification step S20 according to the invention is configured to check whether the protocol Pi+1 is attached to a known protocol chain according to a dynamic decision-making tree by querying a dynamic session database BDDS comprising identified protocol chains.

According to one embodiment of the invention, after a protocol has been identified during the session detection classification step S20, the dynamic session database BDDS is updated.

In the case of attachment, the protocol Pi+1 is identified, and the protocol Pi+2 is analysed by repeating the explicit detection classification S10 step and session detection classification step S20.

Alternatively, in the case of non-attachment, the protocol Pi+1 is analysed according to a deep packet inspection classification step S40.

The deep packet inspection classification step S40 is configured to identify the packet communication protocol Pi+1 according to a dynamic decision-making tree correlated to a knowledge database BDC comprising protocol analysis parameters and a database of markers specific to each known protocol.

In practice, if the specific markers of a tested protocol are detected, the protocol Pi+1 is identified.

According to one embodiment of the invention, after a protocol has been identified during the deep packet inspection classification step S40, the dynamic session database BDDS is updated.

Alternatively, if the protocol Pi+1 is not identified, the method according to the invention comprises a sub-step of issuing a list of potential candidate protocols for Pi+1, to be taken into account according to at least two detection branches B1, B2, each detection being attached to a sub-session determined to analyse the next protocol or protocols Pi+n with n≥2 by repeating the explicit detection classification steps S10, by session detection S20, and by deep packet inspection S40 until at least one protocol, the identity of which is certain, is identified.

In other words, a detection branch B1, B2 will be generated on the basis of a hypothesis of a given potential protocol, and protocol identification Pi+n after Pi+1 will be implemented by repeating classification steps S10, S20 and S40.

If a protocol Pi+n, the identity of which is certain, is identified on a detection branch B1, B2, the detection branch B1, B2 will be retroactively validated, and the remaining non-validated detection branches will be eliminated.

According to one embodiment of the invention, after a protocol has been identified during the session classification detection step S20 and deep packet inspection classification step S40, or by identification a posteriori, the dynamic session database BDDS is updated.

If it is impossible to identify a protocol Pi+n, the identity of which is certain, on a detection branch, the protocol Pi+1 is retrospectively classified as unknown S60.

Advantageously, updating the dynamic session database BDDS speeds up the identification process and limits the number of protocols labelled as unknown.

The method furthermore comprises a labelling step involving associating a label with the data packets according to each session for which the protocols have been identified.

The method according to the invention furthermore comprises, after each classification step S10, S20, S40, a step of calculating a digital session fingerprint Hi+n based on a chosen hash function, said digital fingerprint Hi+n being calculated on the basis of the first protocol identified, and on the previously calculated digital fingerprint Hi+n−1 of the protocol chain already identified without taking account of the attached content.

In practice, each digital fingerprint Hi+n is calculated on the basis of selected parameters or tuples specific to each type of protocol, wherein each type of protocol has its own defined number of tuples, i.e. n-Tuples.

For instance, the defined markers also known as n-Tuples may non-limitatively belong to the group formed by destination IP, source IP, destination port, source port, protocol, IP address, port, QoS quality of service parameters, network tag, session volume, packet size, number of retries, version, encryption algorithm type and version, encryption type, CERT (Computer Emergency Response Team) certificate, SNI (Server Name Indication) value, packet size, returned IP, error flag, domain name, client version, server version, encryption algorithm version, compression algorithm, timestamp, IP version, hostname, lease-time, URL, user agent, number of bytes of content attached, content type, status code, cookie header, client name, request service, error code value, request type, protocol value, response timestamp, privilege level, keyboard type and language, product identification, screen size, or any similar specific metadata extracted from the protocols in one or more data packets of the validated session, similar specific metadata extracted from the content attached to one or more data packets of the validated session By way of an example according to the invention, each protocol may have a specific set of n-tuples:

Table of examples of extractable metadata for a list of selected protocols.

| PROTOCOLS | EXAMPLES OF EXTRACTED METADATA |
|---|---|
| VLAN and VxLAN | Network tag |
| MPLS | Id |
| TCP | Session volume, packet size, number of retries |
| TLS | version, type and version of the encryption algorithm, CERT of the certificate, SNI value |
| DNS | Packet size, returned IP, error flag, domain name, rcode |
| SSH | Client version, server version, encryption algorithm version, compression algorithm version |
| DHCP | Timestamp, IP version, server IP addresses, endpoint IP address, originating port/protocol - TCP or UDP - server or endpoint hostname, lease-time, . . . |
| HTTP | Url, user agent, number of payload bytes, content type, status code, cookie header, etc. |
| Kerberos | client name, service requested, error code value, request type, protocol value, response timestamp, privilege level, encryption type, . . . |
| LDAP | session duration, number of logon errors, end-of-session flag, query result code, error code, etc. |

| Table of examples of extractable metadata for a list of selected protocols. | |
| --- | --- |
| PROTOCOLS | EXAMPLES OF EXTRACTED METADATA |
| RDP | cookie username, keyboard type and language, client version, product ID, screen size, . . . |

The step of calculating the digital fingerprint Hi+n is followed by a step of saving said digital session fingerprint Hi+n calculated after each protocol identification step following the step S40 or after the retrospective validation step S60.

Saving is performed in a hash table integrated into the dynamic session database BDDS, each digital fingerprint Hi+n being linked to at least one selected session.

In practice, the digital fingerprints Hi+n calculated after each deep packet inspection protocol classification step S40 can be updated retrospectively in the event of delayed identification of a protocol according to the checking step S60.

In other words, the hash table is updated if the detection of at least one session protocol requires the implementation of delayed detection on several packets S60.

According to one embodiment of the invention, if tunneled, multiplexed or multi-channel protocols are detected with certainty, the method according to the invention comprises a first sub-step of generating at least one detection branch A1, A2, B1, B2, C1, C2 per verified protocol to be taken into account for the subsequent analysis.

According to a second sub-step, each detection branch A1, A2, B1, B2, C1, C2 will be treated as a single protocol chain capable of being analysed, and comprises a sub-step for calculating a unique digital session fingerprint Hi+n based on a chosen hash function, attached to a sub-session determined for each detection branch A1, A2, B1, B2, C1, C2, and making it possible to analyse the next protocol or protocols Pi+n.

Finally, the detection of tunneled, multiplexed or multi-channel protocols comprises a last sub-step of saving the digital session fingerprint Hi+n of each detection branch A1, A2, B1, B2, C1, C2, attached to a protocol chain, wherein the saving step is configured to assign a unique identifier to each detection branch A1, A2, B1, B2, C1, C2 of the detected tunneled, multiplexed or multi-channel protocol(s), and thus advantageously not to confuse two sub-sessions which could lead to erroneous analysis information.

Figure 9:
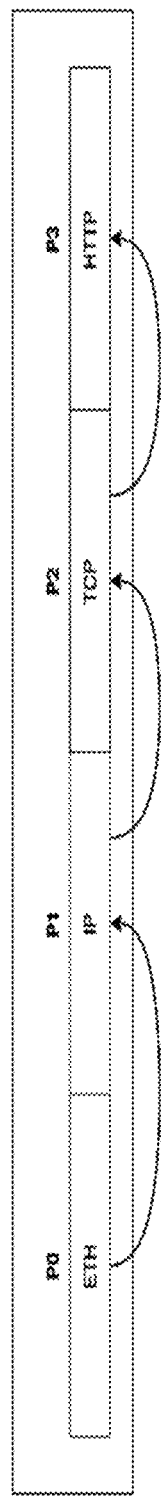
FIGS. 9, 10 and 11 illustrate examples of linear analysis according to the invention.
Figure 10:
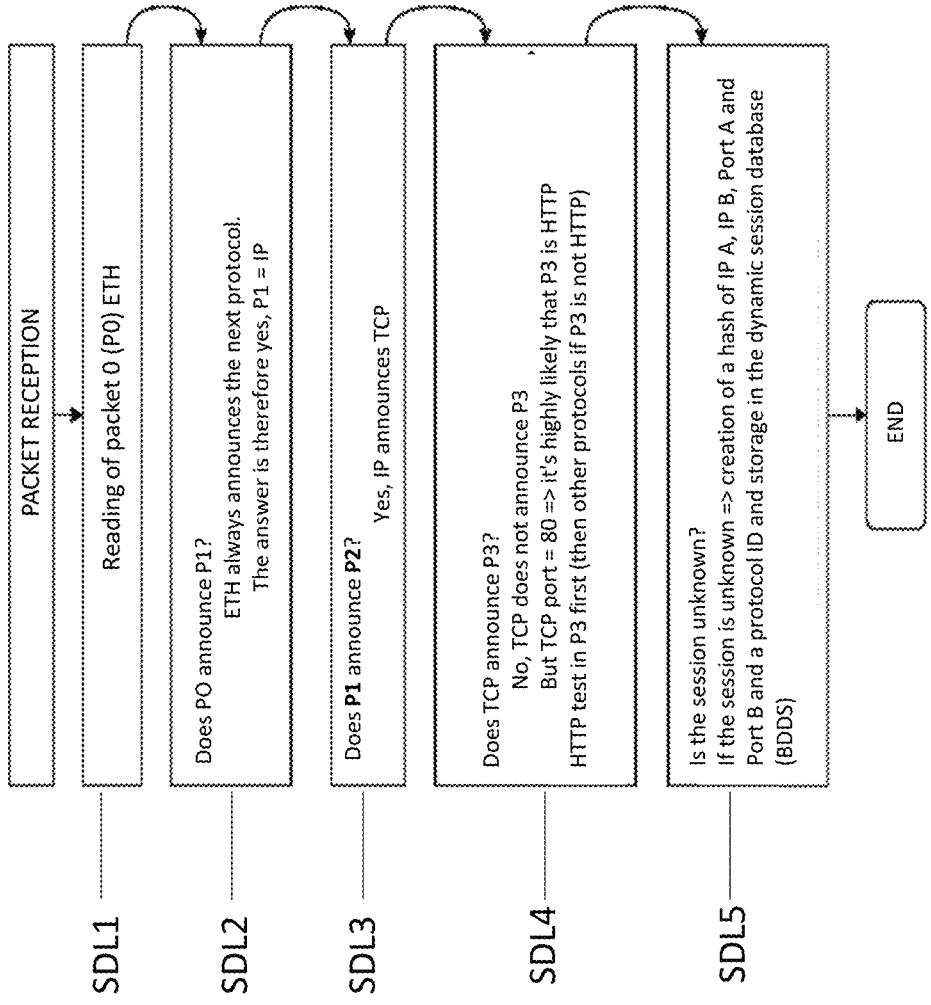

FIGS. 9 and 10 show, by way of an example, an implementation of the method according to the invention using a linear analysis in accordance with the invention.

Here, batch LOT1 comprises four individual packets PO, P1, P2 and P3. Packet PO supports the ETHERNET ETH protocol. Packet P1 supports the INTERNET IP protocol. Packet P2 supports the TCP protocol and the packet P3 supports the http protocol.

After receiving the batch LOT1 of packets, the packet P0 is read (step SDL1), in this case P0=ETH. In step SLD2, the analysis engine checks whether the packet P0 announces the protocol of the next packet P1. Here, it is known that ETH always announces the next protocol. Here P1=IP.

In step SDL3, the analysis engine checks whether the packet P1 announces the protocol of the next packet P2. Here, it is known that IP announces TCP.

In step SDL4, the engine checks whether TCP announces the protocol of the next packet P3. The answer is no, but knowledge of the protocols indicates that if TCP port=80, it is highly likely that P3=http. If the http test in P3 is verified or not, the session is known or unknown.

In step SLD5, if the session is unknown (for example P3 is not http), a digital fingerprint is created of the IPs of source A, destination B, ports A and B and a protocol identifier. The session recognised in this way for the first time is then stored in the dynamic session database for subsequent analysis.

Figure 11:
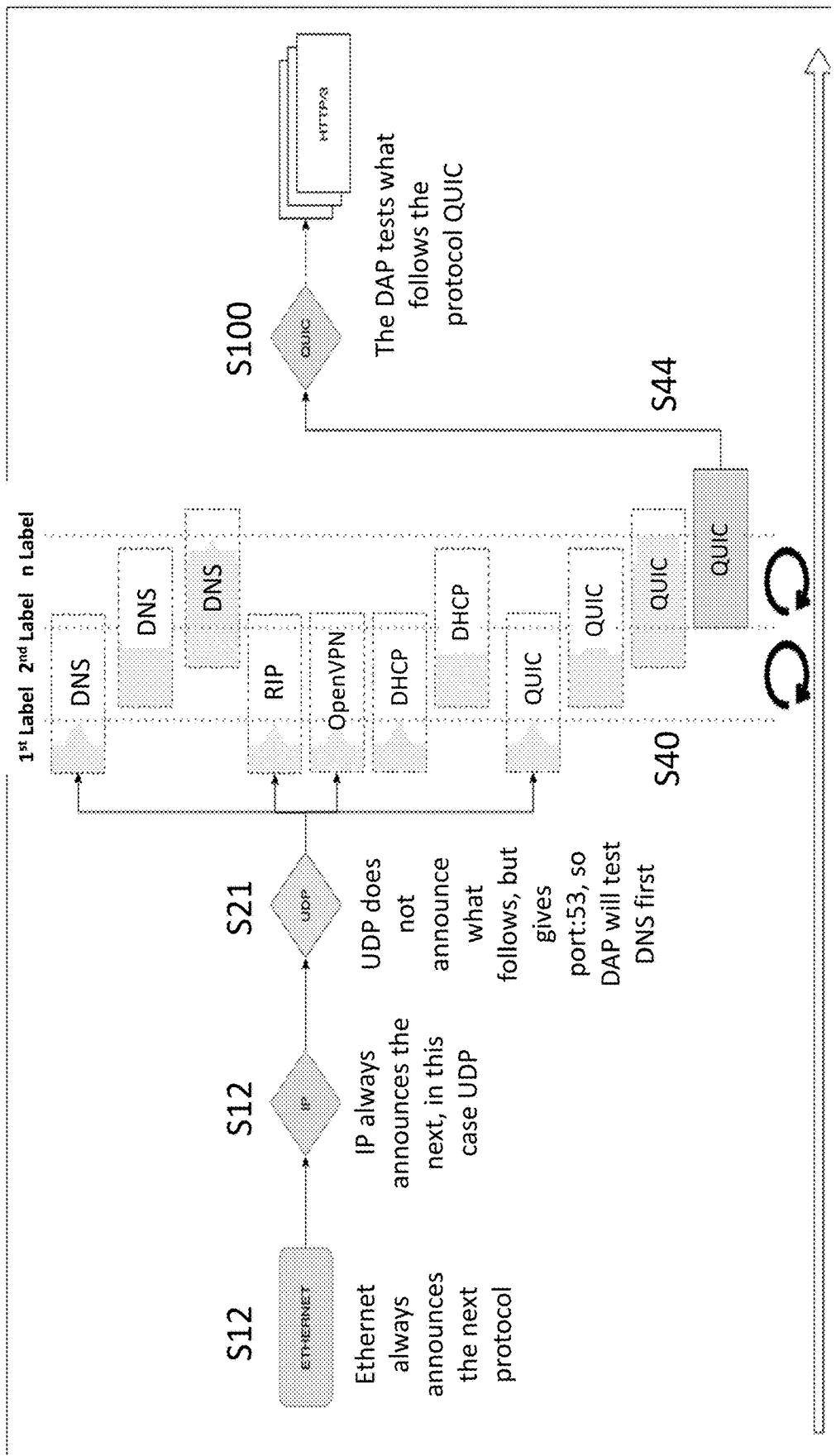

FIG. 11 shows an example of analysis applied to a linear protocol detection for which the UDP protocol is identified, but does not announce the next protocol, wherein the analysis engine 106 implements an analysis according to session detection classification S20 and by deep inspection classification S40, for which the identified port is port: 53, and for which one of the most likely protocols is the DNS protocol.

The DNS protocol is identified as the most likely, and will therefore be tested by attempting to identify markers specific to the DNS protocol.

According to the embodiment, not all the markers (or labels) for the DNS protocol are found.

According to FIG. 11, the QUIC protocol is identified using its own markers by the analysis engine 106.

In practice, the identification of likely protocols and their tests if identification fails are repeated until a limit is reached on the number of tests chosen.

Figure 14:
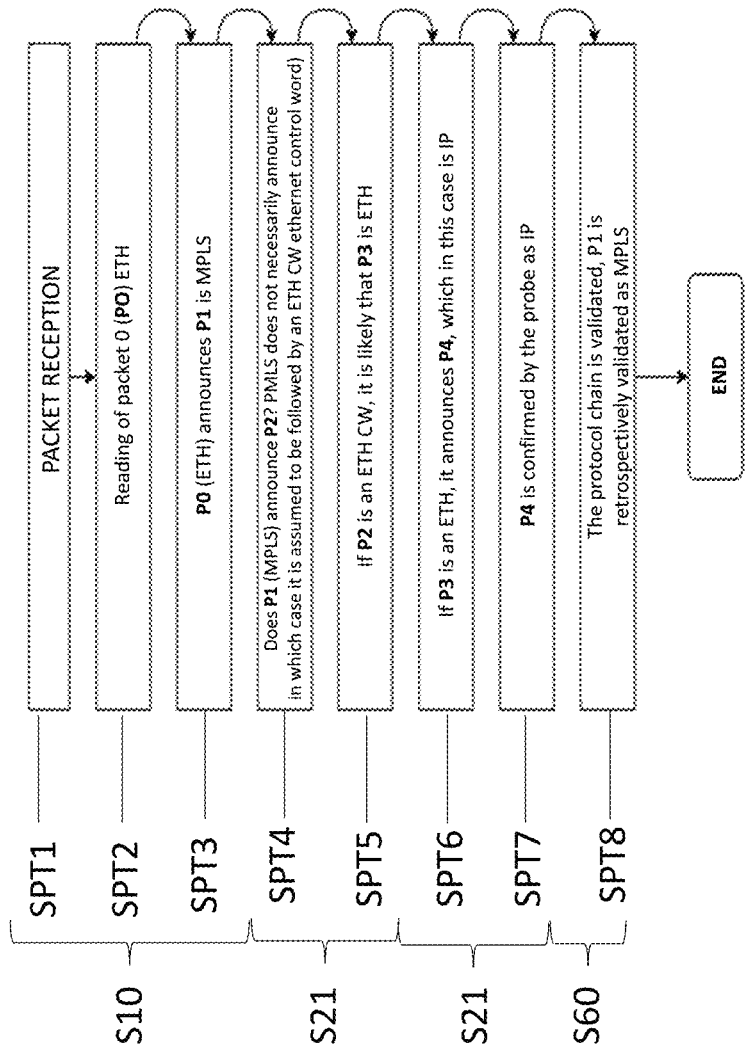
Figure 15:
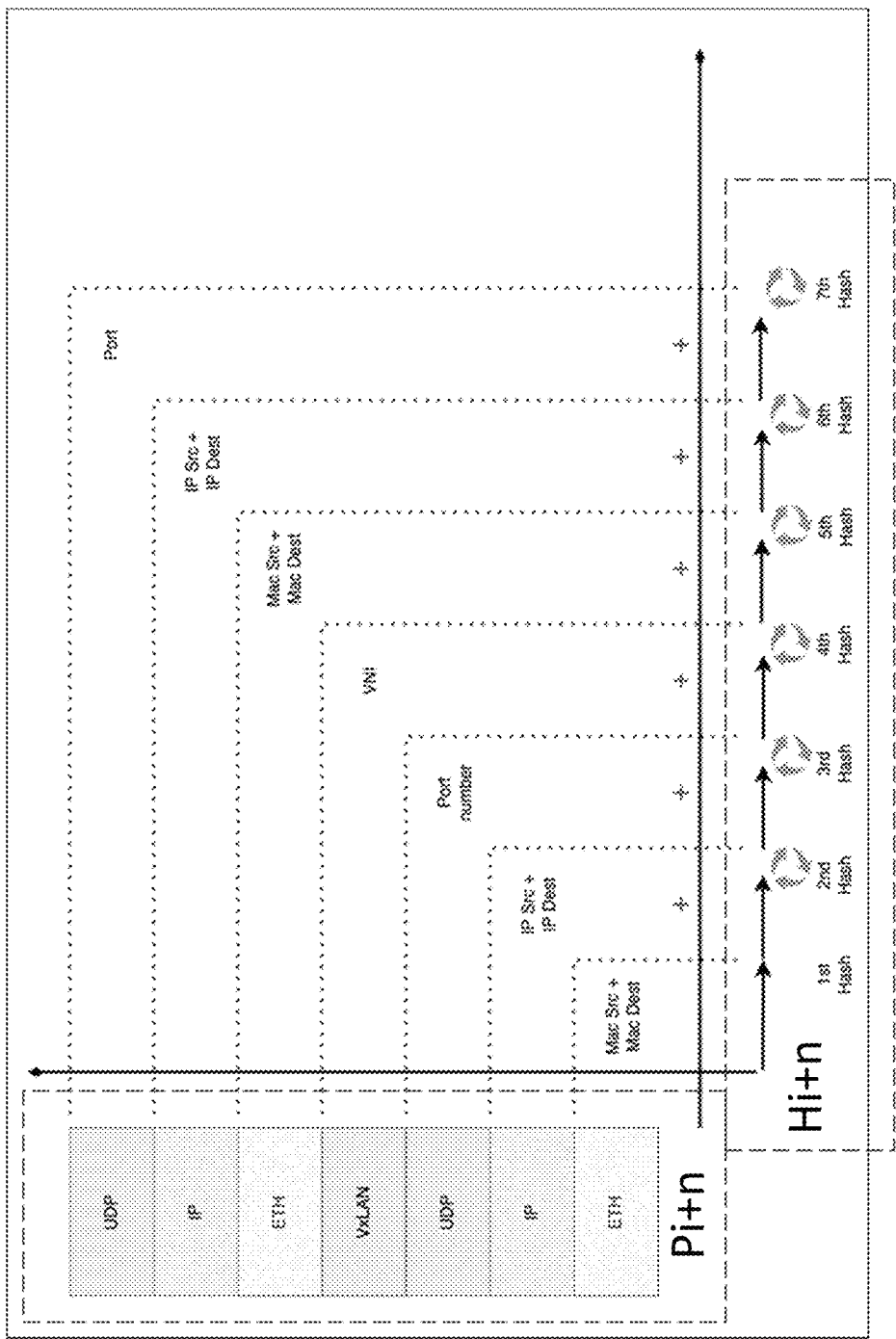
FIG. 15 illustrates an example of analysis applied to protocol detection with management of an associated hash table in accordance with the invention.
Figure 16:
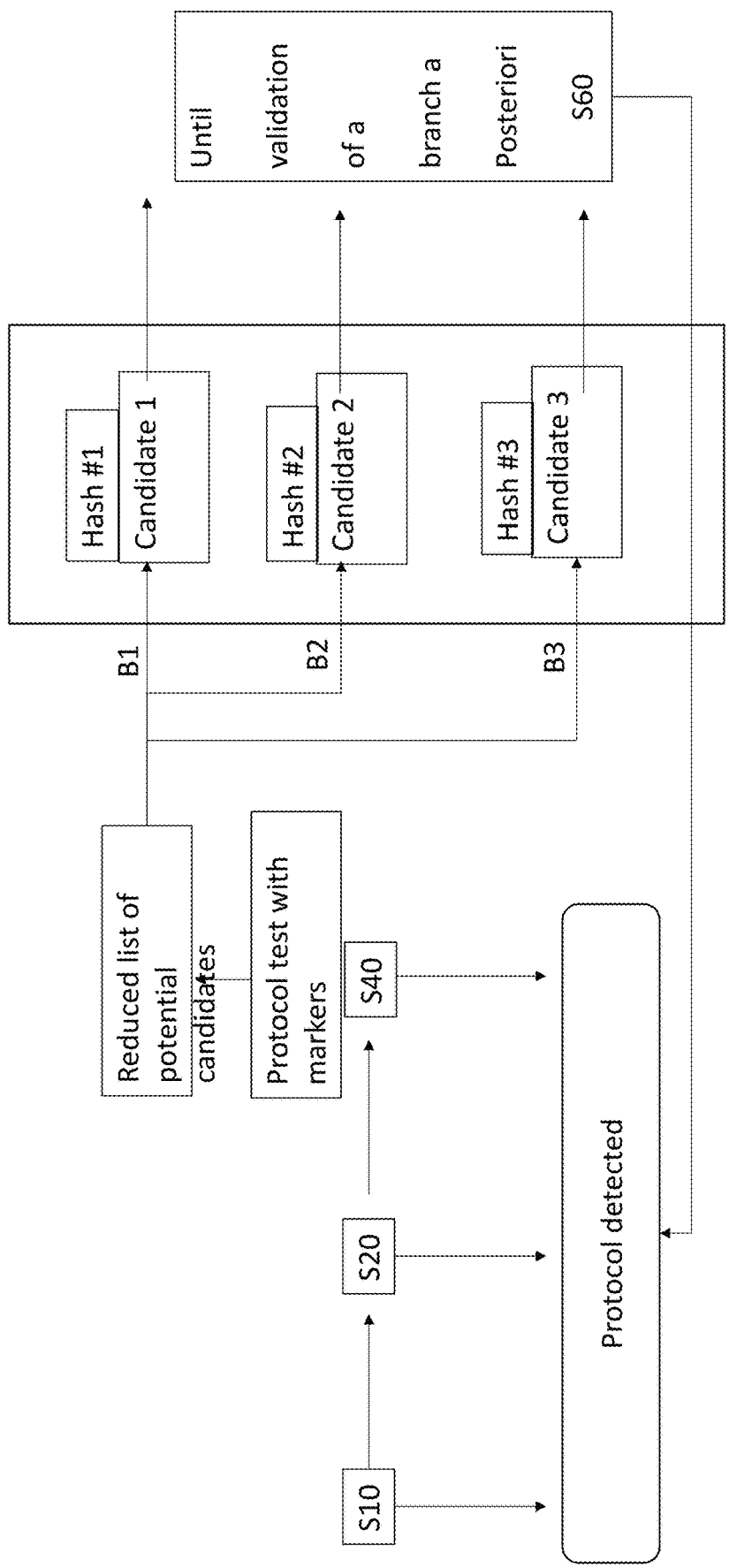
FIGS. 16 and 17 illustrate the management of digital fingerprints during detection in accordance with the invention.
Figure 17:
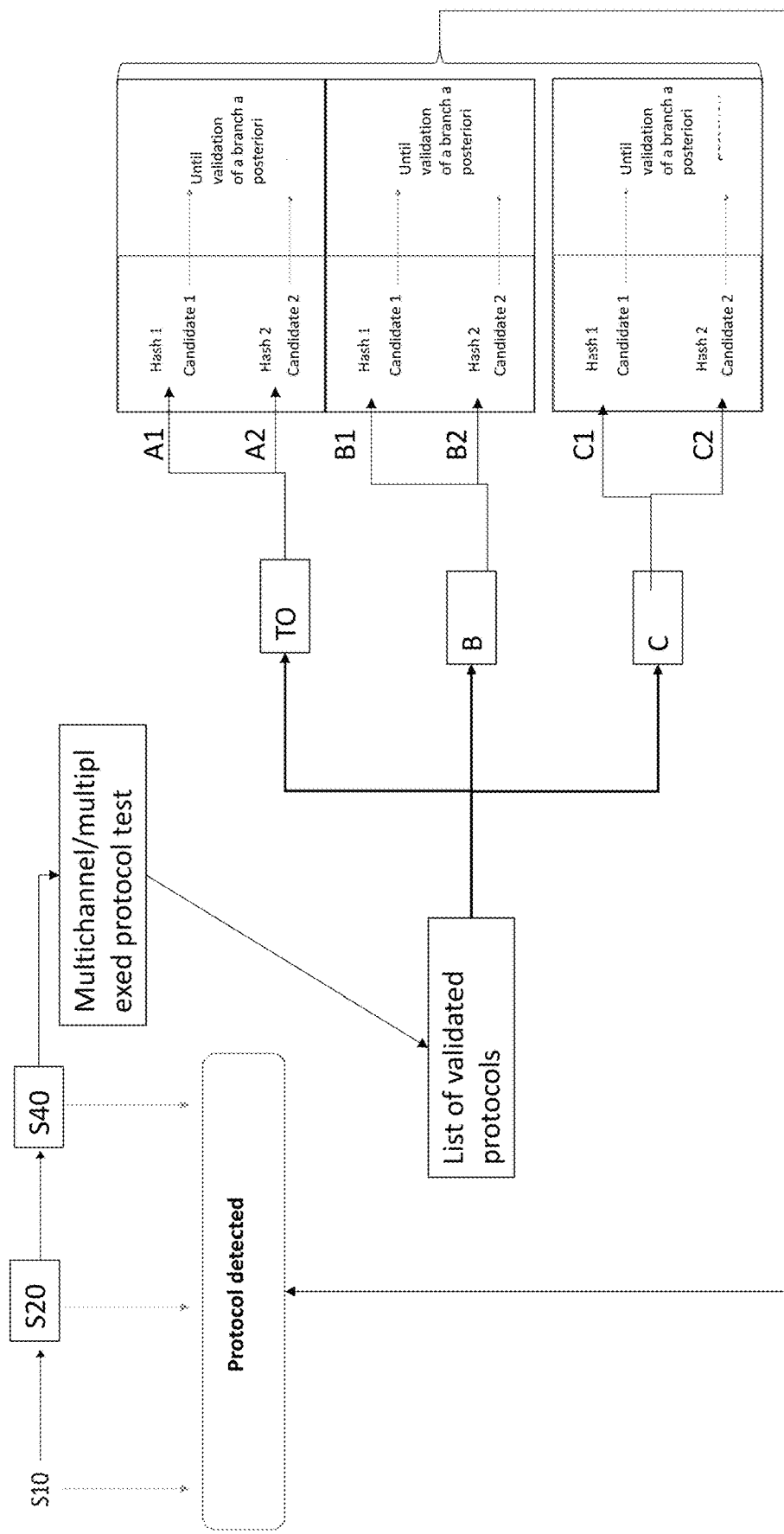
Figure 18:
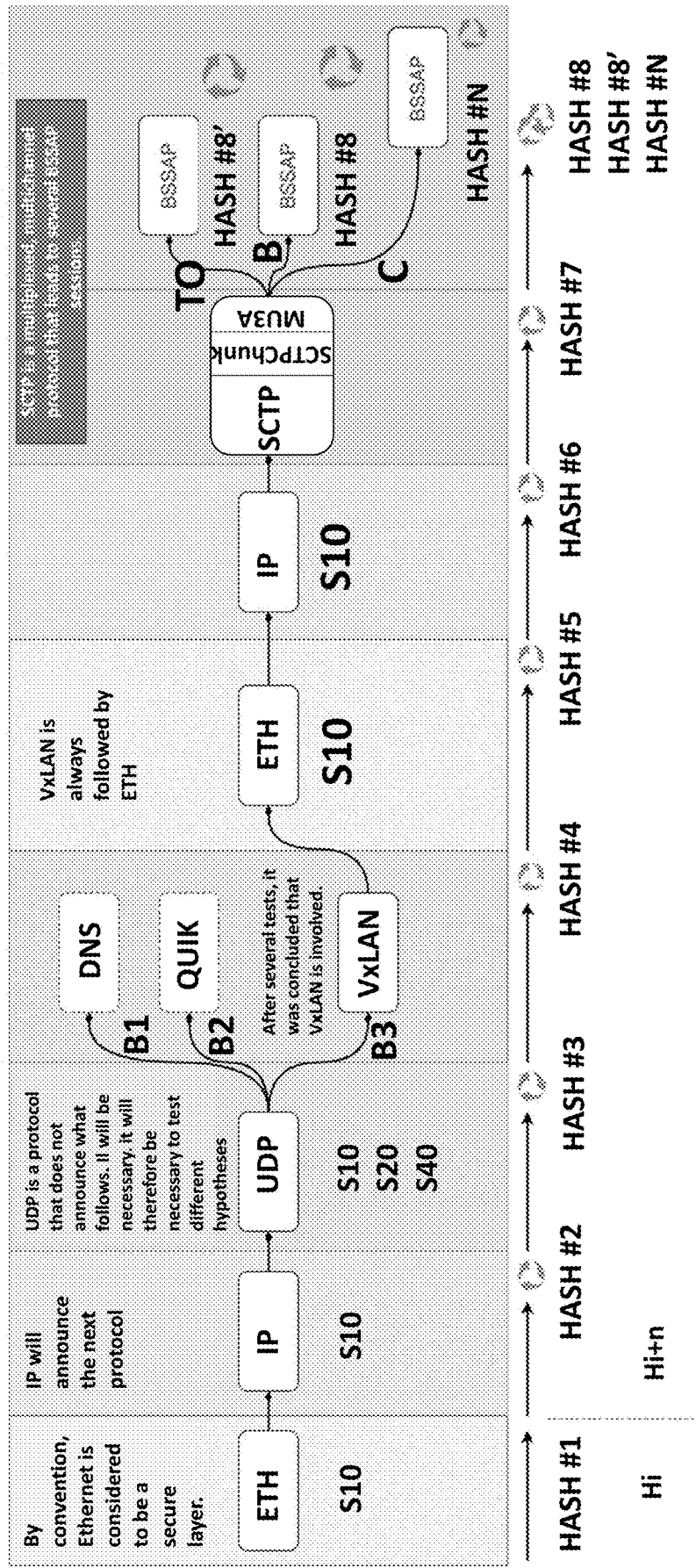
FIG. 18 illustrates an example of analysis applied to detection of multiplexed and multi-channel protocols with management of an associated hash table in accordance with the invention.

FIG. 14 shows a second example of analysis applied to linear protocol detection with identification a posteriori, in which the MPLS protocol is identified on a protocol chain, but does not announce the next protocol, The deep inspection classification analysis S40 cannot identify the associated protocol if the protocol does not include sufficient markers to be identified.

Figure 12:
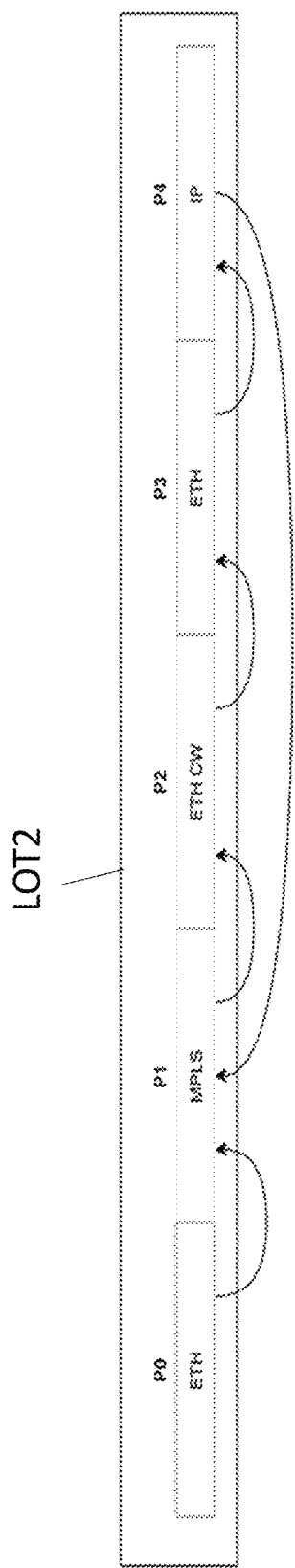
FIGS. 12, 13 and 14 illustrate an example of analysis applied to the detection of delayed detection protocols according to the invention.
Figure 13:
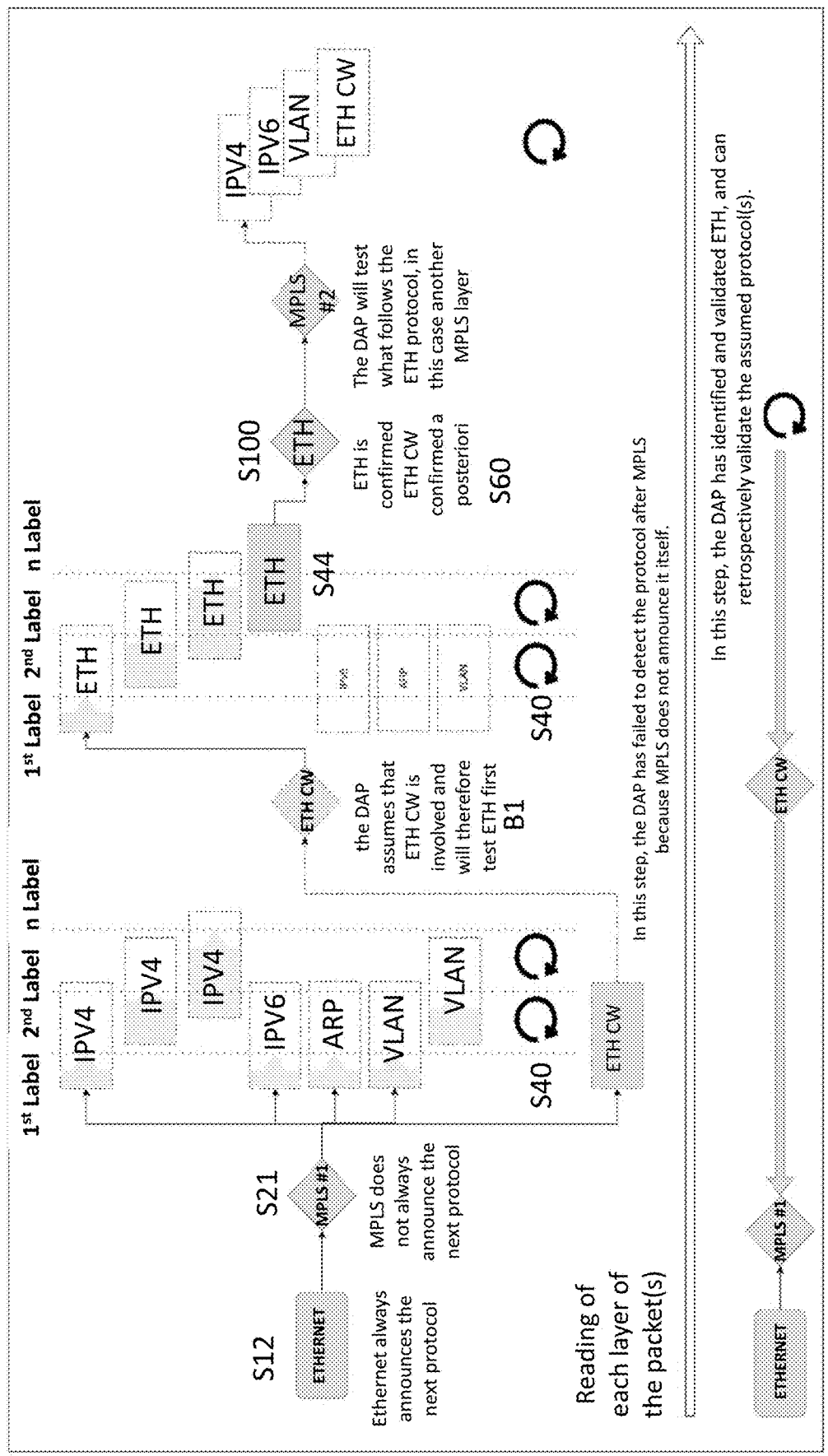

FIGS. 12 and 13 show, by way of an example, an implementation of the method according to the invention for an analysis applied to the detection of tunnelling protocols, requiring delayed detection in accordance with the invention.

Here, batch LOT2 comprises four individual packets PO, P1, P2 and P3. Packet PO supports the ETHERNET ETH protocol. Packet P1 supports the MPLS protocol. Packet P2 supports the ETH CW protocol and the packet P3 supports the IP protocol.

After receiving the batch LOT2 of packets (step SPT1), the packet P0 is read (step SPT2), in this case P0=ETH. In step SPT3, the analysis engine 106 checks whether the packet P0 announces the protocol of the next packet P1 according to the explicit classification step S10. Here, it is known that ETH always announces the next protocol. Here P1=MPLS.

In step SPT4, the analysis engine checks whether the packet P1 announces the protocol of the next packet P2. Here it is known that MPLS does not necessarily announce the next packet.

The protocol analysis according to the invention implements an analysis according to session detection classification S20 and deep packet inspection classification S40, for which the most likely protocols are tested.

It is then assumed that P2 is followed by an ETH CW control word.

The method according to the invention will furthermore include a step of assuming the most likely remaining protocol, and will continue the detection on the next protocol by testing the protocol(s) normally following the first assumed protocol.

In step SPT5, if P2=ETW CW, it is likely that P3=ETH, classification steps S20 and S40 will then be repeated to check whether ETH has been correctly identified and validated.

In step SPT6, if P3=ETH, P3 announces P4, which in this case is IP.

In step SPT7, P4 is confirmed by the probe as IP.

In step SPT8, the protocol chain is validated, P2 is retrospectively validated as ETH CW.

In practice, the identification of likely protocols and their tests if identification fails are repeated until a limit is reached on the number of tests chosen.

Advantageously, the detection method according to the invention, comprising management of a dynamic hash table based on n-tuples, combined with protocol identification according to explicit classifications S10, by session detection S20, by deep packet inspection S40, and by detection a posteriori, greatly limits the loss of visibility and eliminates cascading errors when analysing a very high-speed data stream, unlike systems according to the prior art and in particular those based on a 5-tuple digital fingerprint calculation.

The Applicant has also observed that systems according to the prior art often require hardware techniques (FPGA or ASIC) that enable packet slicing to be carried out on the lower or upper layers to speed up packet processing, whereas the solution according to the invention is a process that does not require implementation of hardware techniques and maintains a stable packet processing speed for data rates in excess of 100 Gb/s, by way of a non-limiting example.

Although examples have been described in language specific to the methods and/or structural features, it should be understood that the present invention is not limited to the specific methods or features described. Instead, the specific methods and features are disclosed and explained by way of examples of the present invention.

What is claimed is:

1. A method for analysing a data stream of batches of packets received via a communications network, wherein the data stream comprises batches of packets each defined by a chain of communication protocols attached to at least one session, wherein the method comprises a protocol analysis (DAP) according to the following steps:
   analysing the first protocol Pi of a chain of communication protocols according to an explicit detection classification step configured to check whether the first protocol (Pi) announces the next communication protocol (Pi+1) of the protocol chain:
   in the case of announcement, the next protocol (Pi+1) thus announced is identified;
   wherein in the case of non-announcement, analysing the next protocol (Pi+1) according to a session detection classification step;
   analysing according to a session detection classification step, configured to check whether the protocol Pi+1 is attached to a known protocol chain according to a dynamic decision-making tree by querying a dynamic session database (BDDS) comprising identified protocol chains:
   in the case of attachment, the protocol Pi+1 is identified, and the protocol Pi+2 is analysed by repeating the explicit detection classification step and session detection classification step;
   wherein in the case of non-attachment, analysing the protocol Pi+1 according to a deep packet inspection classification step;
   analysing the protocol Pi+1 according to a deep packet inspection classification step, configured to identify the packet communication protocol Pi+1 according to a dynamic decision-making tree correlated to a knowledge database (BDC) comprising protocol analysis parameters and a database of markers specific to each known protocol;
   if the protocol Pi+1 is not identified, issuing a list of potential candidate protocols to be taken into account according to at least two detection branches, each detection being attached to a sub-session determined to analyse the next protocol or protocols Pi+n with n≥2 by repeating the steps of explicit detection classification, session detection classification, and deep packet inspection classification until at least one protocol, the identity of which is certain, is identified;
   if a protocol Pi+n, the identity of which is certain, is identified on a detection branch, retrospectively validating the detection branch, and discarding the remaining non-validated detection branches;
   in the case of failure to identify a protocol Pi+n, the identity of which is certain, on a detection branch, retrospectively classifying the protocol Pi+1 as unknown; and
   associating a label with the data packets according to each session for which the protocols have been identified.

2. The method for analysing a data stream of data packets received via a communications network according to claim 1, further comprising, after each classification step:
   determining a digital session fingerprint (Hi+n) from a chosen hash function, said digital fingerprint (Hi+n) being determined on the basis of the first protocol identified, and on the previously determined digital fingerprint (Hi+n−1) of the protocol chain already identified without taking into account the attached content, wherein each digital fingerprint (Hi+n) is determined on the basis of chosen parameters (or tuple) specific to each type of protocol, each type of protocol having its own number of defined markers (n-Tuples);
   saving the digital session fingerprint (Hi+n) calculated after each protocol identification step following the deep packet inspection classification step or after the retrospective validation step, in a hash table integrated into the dynamic session database (BDDS), each digital fingerprint (Hi+n) being linked to at least one chosen session, said digital fingerprints (Hi+n) calculated after each deep packet inspection protocol classification step being capable of being retrospectively updated in the event of delayed identification of a protocol according to the retrospectively classifying the protocol Pi+1 as unknown step.

3. The method for analysing a data stream of data packets received via a communications network according to claim 2, wherein when tunnelled, multiplexed or multi-channel protocols are detected with certainty, the method further comprising according:

generating at least one detection branch per verified protocol to be taken into account for subsequent detection, determining a digital session fingerprint (Hi+n) from a hash function chosen for each detection branch, wherein each detection branch is attached to a sub-session determined to analyse the next protocol(s) Pi+n; and saving the digital session fingerprint (Hi+n) of each detection branch attached to a protocol chain, wherein the saving step is configured to assign a unique identifier to each detection branch of the detected tunnelled, multiplexed or multi-channel protocol(s).

4. The method for analysing a data stream of data packets received via a communications network according to claim 2, wherein the hash table is updated if the detection of at least one session protocol requires the implementation of delayed detection on several packets.

5. The method according to claim 1, wherein the knowledge database (BDC) comprises a static knowledge database, wherein the static knowledge database comprises markers based on empirical knowledge of the characteristics of the protocols, and wherein the empirical knowledge comprises algorithmic means of detecting protocols based on location standards, logical links between communication protocols, requests for comments (RFC) and frequency models of communication protocols.

6. The method according to claim 1, further comprising performing a data analysis followed by a data extraction (DAC) for the data packets based on the associated label.

7. The method according to claim 6, wherein the protocol analysis (DAP), and the analysis and extraction of the data (DAC) for a data packet are performed dynamically on a single processing core of a multi-core processor.

8. The method according to claim 6, wherein the analysis and the extraction of the data (DAC) for the data packet are performed on several processing cores of a multi-core processor.

9. The method according to claim 6, further comprising separating the data stream into a plurality of processing queues wherein the protocol analysis (DAP) followed by the analysis and extraction of the data (DAC) are performed on data packets in each of the processing queues.

10. The method according to claim 9, wherein the separation of the data stream into the plurality of processing queues is based on an RSS receive side scaling algorithm.

11. The method according to claim 1, wherein the protocol analysis (DAP) is performed dynamically on layers 2 to 7 of the (OSI) layer model.

12. An IT system for analysing a data stream of data packets received via a communications network, wherein the data stream comprises batches of packets each defined by a chain of communication protocols attached to at least one session, wherein the system comprising: a processor comprising at least one processing core for processing a predetermined number of data packets per minute and a protocol analysis engine on the at least one processing core, wherein the protocol analysis engine is configured to:

analyse the first protocol (Pi) of a chain of communication protocols according to an explicit detection classification step configured to check whether the first protocol (Pi) announces the next communication protocol (Pi+1) of the protocol chain, in the case of announcement, the next protocol (Pi+1) thus announced is identified, whereas in the case of non-announcement, the protocol analysis engine is configured to analyse the protocol (Pi+1) according to a session detection classification step;

analyse according to a session detection classification step, configured to check whether the protocol Pi+1 is attached to a known protocol chain according to a dynamic decision-making tree by querying a dynamic session database (BDDS) comprising identified protocol chains:

in the case of attachment, the protocol Pi+1 is identified, and the protocol analysis engine is configured to analyse the protocol Pi+2 by repeating the explicit detection classification step and session detection classification step;

whereas in the case of non-attachment, the protocol analysis engine is configured to analyse the protocol Pi+1 according to a deep packet inspection classification step;

analyses the protocol Pi+1 according to a deep packet inspection classification step, configured to identify the packet communication protocol Pi+1 according to a dynamic decision-making tree correlated to a knowledge database (BDC) comprising protocol analysis parameters and a database of markers specific to each known protocol;

if the protocol Pi+1 is not identified, the protocol analysis engine is configured to issue a list of potential candidate protocols to be taken into account according to at least two detection branches, each detection being attached to a sub-session determined to analyse the next protocol or protocols Pi+n with n≥2 by repeating the steps of explicit detection classification, session detection classification, and deep packet inspection classification until at least one protocol, the identity of which is certain, is identified;

if a protocol Pi+n, the identity of which is certain, is identified on a detection branch, the protocol analysis engine is configured to retrospectively validate the detection branch, and discarding the remaining non-validated detection branches;

in the case of failure to identify a protocol Pi+n, the identity of which is certain, on a detection branch, the protocol analysis engine is configured to retrospectively classify the protocol Pi+1 as unknown; and a labelling engine capable of associating a label with the data packets as a function of the protocols thus identified.

13. The IT system according to claim 12, wherein the protocol analysis engine is further configured to:

determine a digital session fingerprint (Hi+n) from a hash function chosen after each classification step, said digital fingerprint (Hi+n) being determined on the basis of the first protocol identified, and on the previously determined digital fingerprint (Hi+n−1) of the protocol chain already identified without taking into account the attached content, wherein each digital fingerprint (Hi+n) is determined on the basis of chosen parameters (or tuple) specific to each type of protocol, each type of protocol having its own number of defined markers (n-Tuples);

save the digital session fingerprint (Hi+n) calculated after each protocol identification step following the deep packet inspection classification step or after the retrospective validation step, in a hash table integrated into the dynamic session database (BDDS), each digital fingerprint (Hi+n) being linked to at least one chosen session, said digital fingerprints (Hi+n) calculated after each deep packet inspection protocol classification step being capable of being retrospectively updated in the event of delayed identification of a protocol according to the checking step.

14. The IT system according to claim 12, wherein the protocol analysis engine, in the event of detection of tunnelled, multiplexed, multi-channel, or multiplexed multi-channel protocols detected with certainty, is further configured to:
generate at least one detection branch per verified protocol to be taken into account for subsequent detection,
determine a digital session fingerprint (Hi+n) from a hash function chosen for each detection branch, wherein each detection branch is attached to a sub-session determined to analyse the next protocol(s) Pi+n; and
save the digital session fingerprint Hi+n of each detection branch attached to a protocol chain, wherein the protocol analysis engine is configured to assign a unique identifier to each detection branch of the detected tunnelled, multiplexed, multichannel or multiplexed multi-channel protocol(s).

15. The IT system according to claim 12, wherein the knowledge database furthermore comprises a static knowledge database, wherein the static knowledge database comprises markers based on empirical knowledge of the characteristics of the protocols, and wherein the empirical knowledge comprises algorithmic means of detecting protocols based on location standards, logical links between communication protocols, requests for comments (RFC) and frequency models of communication protocols.

16. The IT system according to claim 12, further comprising: a content analysis engine executable on at least one processing core to analyse and extract the data packet based on the associated label.

17. The IT system according to claim 16, wherein the protocol analysis engine and the content analysis engine consecutively perform protocol analysis (DAP) followed by data analysis and extraction (DAC) for the data stream of data packets, and wherein the content analysis engine performs, separately, data analysis and extraction (DAC) for differently labelled data packets.

18. The IT system according to claim 16, further comprising a network interface card (NIC) coupled to the processor, wherein the network card separates the data stream of data packets into a plurality of processing queues, and wherein the protocol analysis engine (DAP) and the content analysis engine perform packet analysis (DAP) and packet data extraction (DAC) on each of the plurality of processing queues.

19. The IT system according to claim 18, wherein the network card (NIC) separates the data stream of data packets according to the RSS receive side scaling algorithm.

* * * * *